United States Patent
Wang et al.

(10) Patent No.: US 8,709,192 B2
(45) Date of Patent: Apr. 29, 2014

(54) PROTECTIVE COVER SHEET COMPRISING A UV-ABSORBING LAYER FOR A POLARIZER PLATE AND METHOD OF MAKING THE SAME

(75) Inventors: Yongcai Wang, Rochester, NY (US);
Hwei-Ling Yau, Rochester, NY (US);
Timothy J. Hubert, Hilton, NY (US);
Alain E. Gros, Rochester, NY (US);
Timothy C. Schunk, Livonia, NY (US);
Paul M. Hoderlein, Rochester, NY (US)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 518 days.

(21) Appl. No.: 12/578,218

(22) Filed: Oct. 13, 2009

(65) Prior Publication Data
US 2010/0024969 A1 Feb. 4, 2010

Related U.S. Application Data

(62) Division of application No. 11/106,789, filed on Apr. 15, 2005, now Pat. No. 7,622,185.

(51) Int. Cl.
*B32B 37/20* (2006.01)
*B32B 38/10* (2006.01)

(52) U.S. Cl.
USPC ........... 156/231; 156/238; 156/239; 156/243; 156/246; 156/247

(58) Field of Classification Search
USPC ......... 156/230, 235, 239, 247, 299, 231, 238, 156/243, 246
See application file for complete search history.

(56) References Cited

U.S. PATENT DOCUMENTS

| | | | |
|---|---|---|---|
| 4,396,642 A | 8/1983 | Bolt et al. | |
| 4,675,219 A | 6/1987 | Muneki et al. | |
| 4,708,908 A | 11/1987 | Tateoka et al. | |
| 4,861,664 A | 8/1989 | Goossens et al. | |
| 5,025,049 A | 6/1991 | Takarada et al. | |
| 5,384,235 A | 1/1995 | Chen et al. | |
| 5,385,815 A | 1/1995 | Schofield et al. | |
| 5,948,605 A | 9/1999 | Wang et al. | |
| 6,008,940 A | 12/1999 | Michihata et al. | |
| 6,068,794 A * | 5/2000 | Kobayashi et al. | ........... 252/585 |
| 6,312,807 B1 | 11/2001 | Ludwig et al. | |
| 6,787,202 B2 | 9/2004 | Mizutani et al. | |

(Continued)

FOREIGN PATENT DOCUMENTS

| | | | |
|---|---|---|---|
| EP | 0340564 A2 | 11/1989 | |
| EP | 0340565 A2 | 11/1989 | |

(Continued)

OTHER PUBLICATIONS

Japanese Office Action dated Oct. 14, 2010, issued in corresponding Japanese Patent Application No. 2008-506535.

(Continued)

*Primary Examiner* — Scott W Dodds
(74) *Attorney, Agent, or Firm* — Westerman, Hattori, Daniels & Adrian, LLP

(57) ABSTRACT

The invention relates to a protective cover sheet comprising a low birefringence protective polymer film and a layer that promotes adhesion to poly(vinyl alcohol), the protective cover sheet comprising at least one functional layer containing a UV-absorbing polymer.

4 Claims, 7 Drawing Sheets

(56) References Cited

U.S. PATENT DOCUMENTS

| | | | |
|---|---|---|---|
| 7,246,152 B2 | 7/2007 | Takayama et al. | |
| 7,252,733 B2 * | 8/2007 | Wang et al. | 156/230 |
| 7,279,060 B2 * | 10/2007 | Chen et al. | 156/230 |
| 7,627,647 B2 | 12/2009 | Takayama et al. | |
| 8,099,475 B2 | 1/2012 | Takayama et al. | |
| 8,239,484 B2 | 8/2012 | Takayama et al. | |
| 8,341,240 B2 | 12/2012 | Takayama et al. | |
| 2002/0041352 A1 * | 4/2002 | Kuzuhara et al. | 349/117 |
| 2002/0102368 A1 * | 8/2002 | Ono et al. | 428/1.33 |
| 2002/0156802 A1 | 10/2002 | Takayama et al. | |
| 2003/0017281 A1 | 1/2003 | Mizutani et al. | |
| 2003/0057595 A1 * | 3/2003 | Tsujimoto | 264/217 |
| 2003/0214715 A1 | 11/2003 | Bermel | |
| 2003/0215581 A1 | 11/2003 | Bermel | |
| 2003/0215582 A1 | 11/2003 | Bermel | |
| 2003/0215583 A1 | 11/2003 | Bermel | |
| 2003/0215608 A1 | 11/2003 | Bermel | |
| 2003/0215621 A1 * | 11/2003 | Bermel | 428/212 |
| 2003/0215658 A1 | 11/2003 | Bermel | |
| 2004/0004652 A1 | 1/2004 | Kida et al. | |
| 2005/0170156 A1 | 8/2005 | Bermel | |
| 2006/0127608 A1 | 6/2006 | Bermel | |
| 2006/0188708 A1 | 8/2006 | Bermel | |
| 2007/0250599 A1 | 10/2007 | Takayama et al. | |
| 2010/0049829 A1 | 2/2010 | Takayama et al. | |
| 2010/0153519 A1 | 6/2010 | Takayama et al. | |
| 2012/0042045 A1 | 2/2012 | Takayama et al. | |

FOREIGN PATENT DOCUMENTS

| | | |
|---|---|---|
| JP | 61-86259 A | 5/1986 |
| JP | 62-146951 A | 6/1987 |
| JP | 63-083117 A | 4/1988 |
| JP | 64-55307 A | 3/1989 |
| JP | 01-096266 A | 4/1989 |
| JP | 1-247431 A | 10/1989 |
| JP | 02-016048 A | 1/1990 |
| JP | 02-16129 A | 1/1990 |
| JP | 3-6282 A | 1/1991 |
| JP | 04-106161 A | 4/1992 |
| JP | 6-082962 A | 3/1994 |
| JP | 06-148430 A | 5/1994 |
| JP | 7-1692 A | 1/1995 |
| JP | 9-203810 A | 8/1997 |
| JP | 09-230138 A | 9/1997 |
| JP | 9-251101 A | 9/1997 |
| JP | 10-088106 A | 4/1998 |
| JP | 2001-047584 A | 2/2001 |
| JP | 2002-19064 A | 1/2002 |
| JP | 2002-169020 A | 6/2002 |
| JP | 2002-172743 A | 6/2002 |
| JP | 2002-328223 A | 11/2002 |
| JP | 2002-363420 A | 12/2002 |
| JP | 2003-506545 A | 2/2003 |
| JP | 2003-334833 A | 11/2003 |
| JP | 2004-009405 A | 1/2004 |
| JP | 2004-061824 A | 2/2004 |
| JP | 2004-148542 A | 5/2004 |
| JP | 2004-237451 A | 8/2004 |
| JP | 2005-25120 A | 1/2005 |
| JP | 2005-43749 A | 2/2005 |
| TW | 2005-08644 A | 3/2005 |
| TW | 2005-08648 A | 3/2005 |
| WO | 2004-089639 A1 | 10/2004 |
| WO | 2005/111667 A2 | 11/2005 |
| WO | 2006/057799 A1 | 6/2006 |
| WO | 2006/057800 A1 | 6/2006 |

OTHER PUBLICATIONS

International Search Report mailed Aug. 3, 2006; issued in corresponding International Application No. PCT/US2006/012974.

Japanese Office Action dated Nov. 30, 2011, issued in corresponding Japanese Patent Application No. 2008-506535.

Japanese Office Action dated Sep. 6, 2011, issued in corresponding Japanese Patent Application No. 2008-506535.

Chinese Office Action dated Jan. 12, 2012, issued in corresponding Chinese Patent Application No. 200680012529.9.

Japanese Office Action dated Dec. 18, 2012, issued in corresponding Japanese Patent Application No. 2011-005927, (8 pages). With English Translation.

Taiwanese Office Action dated Jan. 14, 2013, issued in corresponding Taiwanese patent application No. 095113303, w/ English translation.

Japanese Office Action dated May 1, 2013, issued in corresponding Japanese Patent Application No. 2011-005927, w/English translation.

* cited by examiner

PROTECTIVE COVER SHEET COMPRISING A UV-ABSORBING LAYER FOR A POLARIZER PLATE AND METHOD OF MAKING THE SAME

CROSS-REFERENCE TO RELATED APPLICATIONS

This application is a division of U.S. application Ser. No. 11/106,789, filed on Apr. 15, 2005.

FIELD OF THE INVENTION

The present invention generally relates to low birefingence protective polymer films used in protective cover sheets for polarizer plates an improved method for producing polarizing plates, and an electronic displays employing the same. More particularly, the invention relates to a protective cover sheet comprising one or more functional layers, including a layer that promotes adhesion to polyvinyl alcohol-containing dichroic films, wherein a UV-absorbing polymer is contained in at least one of the functional layers.

BACKGROUND OF THE INVENTION

Transparent resin films are used in a variety of optical applications. For example, a number of different optical elements in Liquid Crystal Displays ("LCDs") may be formed from resin films. The structure of LCDs may include a liquid crystal cell, one or more polarizer plates, and one or more light management films. Liquid crystal cells are formed by confining liquid crystals such as vertically-aligned (VA), in-plane switching (IPS), twisted nematic (TN) or super twisted nematic (STN) materials between two electrode substrates. Polarizer plates are typically a multi-layer element comprising resin films. In particular, a polarizer plate can comprise a polarizing film sandwiched between two protective cover sheets that comprise a low birefingence protective polymer film.

Polarizing films are normally prepared from a transparent and highly uniform, amorphous resin film that is subsequently stretched to orient the polymer molecules and then stained with a dye to produce dichroic film. An example of a suitable resin for the formation of polarizer films is fully hydrolyzed poly(vinyl alcohol) (PVA). Because the stretched PVA films used to form polarizers are very fragile and dimensionally unstable, protective cover sheets are normally laminated to both sides of the PVA film to offer both support and abrasion resistance.

Protective cover sheets used in polarizer plates are required to have high uniformity, good dimensional and chemical stability, and high transparency. Originally, protective coversheets were formed from glass, but a number of resin films are now used to produce lightweight and flexible polarizers. Many resins have been suggested for use in protective cover sheets including cellulosics, acrylics, cyclic olefin polymers, polycarbonates, and sulfones. However, acetyl cellulose polymers are most commonly used in protective cover sheets for polarizer plates. Polymers of the acetyl cellulose type are commercially available in a variety of molecular weights as well as the degree of acyl substitution of the hydroxyl groups on the cellulose backbone. Of these, the fully substituted polymer, triacetyl cellulose (TAC) is commonly used to manufacture resin films for use in protective cover sheets for polarizer plates.

The cover sheet normally requires a surface treatment to insure good adhesion to the PVA dichroic film. When TAC is used as the protective cover film of a polarizer plate, the TAC film is subjected to treatment in an alkali bath to saponify the TAC surface to provide suitable adhesion to the PVA dichroic film. The alkali treatment uses an aqueous solution containing a hydroxide of an alkali metal, such as sodium hydroxide or potassium hydroxide. After alkali treatment, the cellulose acetate film is typically washed with weak acid solution followed by rinsing with water and drying. This saponification process is both messy and time consuming.

U.S. Pat. No. 2,362,580 describes a laminar structure wherein two cellulose ester films each having a surface layer containing cellulose nitrate and a modified PVA is adhered to both sides of a PVA film. JP 0609491 SA discloses a protective film for polarizer plates wherein the protective film has a hydrophilic layer which provides adhesion to PVA film. Commonly-assigned, copending U.S. patent application Ser. No. 10/838,841, filed May 4, 2004 describes a guarded protective cover sheet having a removable, carrier substrate and a cover sheet comprising a low birefringence protective polymer film and a layer promoting adhesion to poly(vinyl alcohol) on the same side of the carrier substrate as the low birefringence protective polymer film which eliminates the need for the saponification process.

Protective cover sheets may be a composite or multilayer film including other functional layers (herein also referred to as auxiliary layers) such as an antiglare layer, antireflection layer, anti-smudge layer, compensation layer, or antistatic layer. Generally, these functional layers are applied in a process step that is separate from the manufacture of the low-birefringence protective polymer film, but may be later applied to a form a composite film. A functional or auxiliary film may combine functions of more than one functional layer, or a protective polymer film may also serve the function of a functional layer.

For example, some LCD device may contain a low birefringence protective polymer film that also serves as a compensation film to improve the viewing angle of an image. Compensation films (i.e. retardation films or phase difference films) are normally prepared from amorphous films that have a controlled level of birefringence prepared, for example, either by uniaxial stretching or by coating with discotic dyes. Suitable resins suggested for formation of compensation films by stretching include poly(vinyl alcohol)s, polycarbonates and sulfones. Compensation films prepared by treatment with dyes normally require highly transparent films having low birefringence such as TAC and cyclic olefin polymers.

Examples of optical films prepared by casting methods include: (1) Cellulose acetate sheets used to prepare light polarizing films as disclosed in U.S. Pat. No. 4,895,769 to Land and U.S. Pat. No. 5,925,289 to Cael as well as more recent disclosures in U.S. Patent Application. 2001/0039319 A1 to Harita and U.S. Patent Application 2002/001700 A1 to Sanefiji; (2) Cellulose triacetate sheets used for protective covers for light polarizing films as disclosed in U.S. Pat. No. 5,695,694 to Iwata; (3) Polycarbonate sheets used for protective covers for light polarizing films or for retardation plates as disclosed in U.S. Pat. No. 5,818,559 to Yoshida and U.S. Pat. Nos. 5,478,518 and 5,561,180 both to Taketani; and (4) Polyethersulfone sheets used for protective covers for light polarizing films or for retardation plates as disclosed in U.S. Pat. Nos. 5,759,449 and 5,958,305 both to Shiro.

It would be desirable to further improve the optical properties of a film and protective cover sheets to increase the amount of light output in a display. The use of UV dyes in the prior art have caused problems of migrating to the surface causing surface haze and light scattering which reduces optical transmittance of the cover sheet.

It would be also very advantageous to avoid the need for saponification of protective cover sheets in the preparation of polarizer plates from resin films which requires a lamination process involving pretreatment in an alkali bath and then application of adhesives, pressure, and high temperatures. Avoiding such a saponification operation would improve both productivity and reduce the necessary conveyance and handling of the sheets. Although advantageous for protective cover sheets in general, this would be especially desirable for relatively thinner protective cover sheets.

SUMMARY OF THE INVENTION

It is an object of the invention eliminate or reduce migrating UV dye from a low birefringence protective polymer film.

It is a further object to provides a low birefringence protective polymer film having a film surface appearance and haze level that is less sensitive to coating/drying process conditions.

It is an object of the present invention to overcome the limitations of prior-art polarizer cover sheets and to provide an improved cover sheet that eliminates the need for complex surface treatments such as saponification prior to the fabrication of polarizer plates.

It is a still further object to provide an improved process for the fabrication of polarizer plates using the novel cover sheets of the invention.

These and other objects of the invention are accomplished by an improved adhesion-promoting layer for adhering polyvinyl alcohol to low birefringence protective polymer films and the presence of a UV-absorbing layer in the same or another function layer.

In particular, the invention is directed to a multilayer protective cover sheet comprising a low birefringence protective polymer film and one or more functional layers, which layers are either adjacent or non-adjacent each other, wherein the one or more functional layers comprise at least an adhesion-promoting layer for adhering a poly(vinyl alcohol)-containing film to said low birefringence protective polymer film, wherein at least one of said one or more functional layers comprise a UV-absorbing polymer.

The invention is also directed to a guarded cover sheet composite comprising a carrier substrate and such a multilayer protective cover sheet.

Finally, the invention is also directed to a method of forming a polarizing plate comprising:

(A) providing two guarded cover sheet composites each comprising:
  (i) a carrier substrate; and
  (ii) a multilayer protective cover sheet according to the invention as described herein;
(B) providing a poly(vinyl alcohol)-containing dichroic film; and
(C) simultaneously or sequentially bringing each protective cover sheet into contact with said poly(vinyl alcohol)-containing dichroic film such that the layer promoting adhesion to a poly(vinyl alcohol)-containing film in each protective cover sheet is in contact with said poly(vinyl alcohol)-containing dichroic film.

Protective cover sheets in accordance with the present invention advantageously eliminate or reduce migration of UV dye, which might otherwise adversely affect subsequent coating processes and film properties. The protective cover sheets are characterized by film surface appearance and haze level that exhibits less sensitivity to coating or drying process conditions.

Protective cover sheets of the invention comprising an adhesion absorbing layer provide excellent adhesion to polyvinyl alcohol-containing dichroic films and eliminate the need to alkali treat the cover sheets prior to lamination to the dichroic films, thereby simplifying the process to manufacture polarizing plates.

Optionally, the multilayer protective cover sheet can comprise various combinations of functional or auxiliary layers, for example, an abrasion-resistant layer, antiglare layer, low reflection layer, antireflection layer, antistatic layer, viewing angle compensation layer, and/or moisture barrier layer, or combinations thereof, may be employed in the cover sheets of the invention.

In one embodiment, the invention is especially advantageous for the manufacture of relatively very thin cover sheets of the invention, which is facilitated by applying the cover sheet coating formulation onto a discontinuous carrier substrate that supports the wet cover sheet film through the drying process and eliminates the need to peel the sheet from a metal band or drum prior to a final drying step as typically performed in the casting methods described in prior art. Rather, the cover sheet is substantially completely dried before separation from the carrier substrate. In fact, the composite comprising the cover sheet and carrier substrate are preferably wound into rolls and stored until needed for the fabrication of polarizer plates.

DETAILED DESCRIPTION OF THE INVENTION

Figure 1:
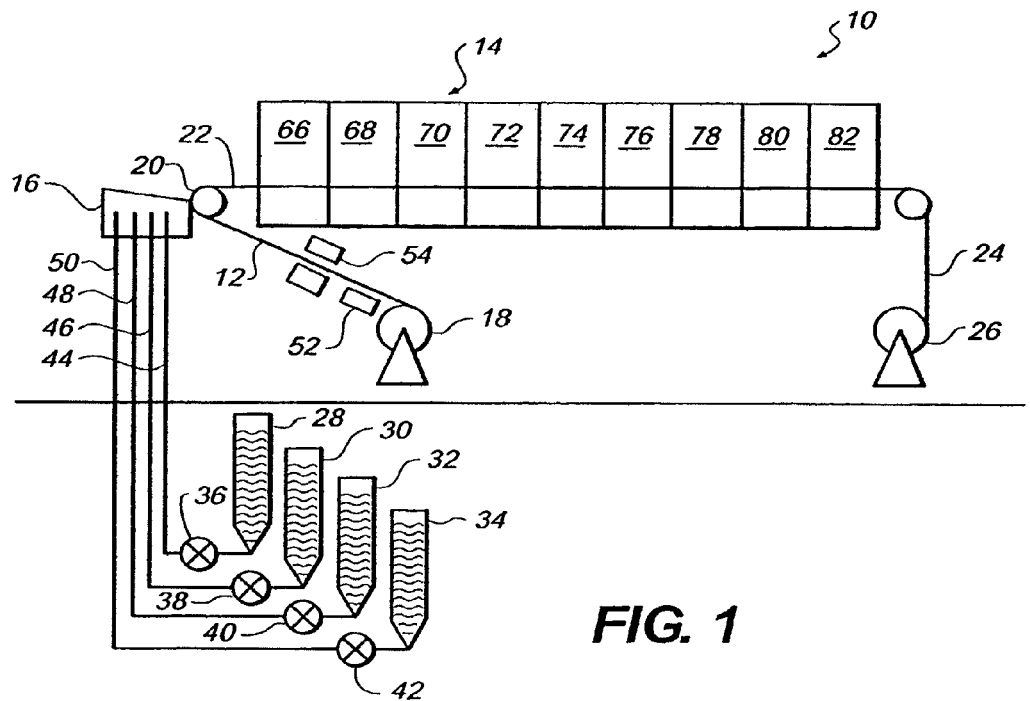
FIG. 1 is a schematic of an exemplary coating and drying apparatus that can be used in the practice of the method of the present invention.

The following definitions apply to the description herein:

In-plane phase retardation, $R_{in}$, of a layer is a quantity defined by $(n_x-n_y)d$, where nx and ny are indices of refraction in the direction of x and y; x is taken as the direction of maximum index of refraction in the x-y plane and y direction is taken perpendicular to it; the x-y plane is parallel to the surface plane of the layer; and d is a thickness of the layer in the z-direction. The quantity (nx−ny) is referred to as in-plane birefringence, $\Delta n_{in}$. The value of $\Delta n_{in}$ is given at a wavelength $\lambda$=550 nm n.

Out of-plane phase retardation $R_{th}$, of a layer is a quantity defined by [nz−(nx+ny)/2]d, where nz is the index of refraction in the z-direction. The quantity [nz−(nx+ny)/2] is referred to as out-of-plane birefringence, $\Delta n_{th}$. If nz>(nx+ny)/2, $\Delta n_{th}$ is positive (positive birefringence), and thus the corresponding $R_{th}$ is also positive. If nz<(nx+ny)/2, $\Delta n_{th}$ is negative (negative birefringence) and $R_{th}$ is also negative. The value of $\Delta n_{th}$ is given at $\lambda$=550 mm.

Intrinsic Birefringence, $\Delta n_{int}$, of a polymer refers to the quantity defined by (ne−no), where ne and no are the extraordinary and the ordinary index of the polymer, respectively. The actual birefringence (in-plane $\Delta n_{in}$ or out-of-plane $\Delta n_{th}$) of a polymer layer depends on the process of forming it, thus the parameter $\Delta n_{int}$.

Amorphous is defined as a lack of long-range order. Thus an amorphous polymer does not show long-range order as measured by techniques such as X-ray diffraction.

Transmission is a quantity to measure the optical transmissivity. It is given by the percentile ratio of out coming light intensity $I_{out}$ to input light intensity $I_{in}$ as $I_{out}/I_{in} \times 100$.

Optic Axis refers to the direction in which propagating light does not see birefringence.

Uniaxial is defined as two of the three indices of refraction, nx, ny, and nz, are essentially the same.

Biaxial is defined as the three indices of refraction, nx, ny, and nz, are all different.

Cover sheets employed in Liquid Crystal Displays are typically polymeric sheets having low optical birefringence that are employed on each side of a dichroic PVA film in order to maintain the dimensional stability of the dichroic film and to protect it from moisture and UV degradation. In the following description, a guarded cover sheet means a cover sheet that is disposed on a removable, protective carrier substrate. A strippable, protective film may also be employed on the side of the cover sheet opposite to the carrier substrate so that both sides of the cover sheet are protected prior to its use in a polarizer plate.

A layer promoting adhesion to PVA is a distinct layer that is applied in a coating step either separate from or simultaneous with the application of the low birefringence polymer film. The layer promoting adhesion to PVA provides acceptable adhesion of the cover sheet to a PVA dichroic film (in a liquid crystal display application) without the need for a wet pretreatment, such as saponification, of the cover sheet prior to lamination to the PVA film.

The present invention is directed to an improved adhesion-promoting layer for adhering polyvinyl alcohol to low birefringence protective polymer films. The adhesion-promoting layer of the invention comprises water-soluble polymer and hydrophobic polymer particles. In particular, the present invention provides a protective cover sheet for polarizing plates comprising a low birefringence protective polymer film and a layer containing a water-soluble polymer and polymer particles that promotes adhesion to polyvinyl alcohol-containing dichroic films.

As mentioned above, the cover sheet of the invention can also comprises one or more auxiliary layers such as an abrasion resistant hardcoat layer, antiglare layer, anti-smudge layer or stain-resistant layer, antireflection layer, low reflection layer, antistatic layer, viewing angle compensation layer, and moisture barrier layer.

The present invention also provides a guarded cover sheet composite comprising a carrier substrate, a low birefringence polymer film, a layer containing a water-soluble polymer and polymer particles that promotes adhesion to polyvinyl alcohol, and optionally one or more auxiliary layers on the same side of said carrier substrate as the low birefringence polymer film. Optionally, the guarded cover sheet composite of the invention also comprises a strippable, protection layer on the side of the cover sheet opposite to the carrier substrate. The guarded cover sheet composite is particularly effective when the low birefringence protective polymer film is relatively thin, for example, when the thickness is about 40 micrometers or less, especially 15 to 30 micrometers thick.

Turning now to FIG. 1 there is shown a schematic of an exemplary and well-known coating and drying system 10 suitable for preparing the cover sheets of the present invention. The coating and drying system 10 may be used to apply very thin films to a moving carrier substrate 12 and to subsequently remove solvent in a dryer 14. A single coating apparatus 16 is shown such that system 10 has only one coating application point and only one dryer 14, but two or three (even as many as six) additional coating application points with corresponding drying sections are known in the fabrication of composite thin films. The process of sequential application and drying is known in the art as a tandem coating operation.

Coating and drying system 10 includes an unwinding station 18 to feed the moving carrier substrate 12 around a back-up roller 20 where the coating is applied by coating apparatus 16. The coated substrate 22 then proceeds through the dryer 14. In one embodiment of the present invention, a guarded cover sheet composite 24 comprising a cover sheet on substrate 12 is wound into rolls at a wind-up station 26.

As depicted, an exemplary four-layer coating is applied to moving web 12. Coating liquid for each layer is held in respective coating supply vessel 28, 30, 32, 34. The coating liquid is delivered by pumps 36, 38, 40, 42 from the coating supply vessels to the coating apparatus 16 via conduits 44, 46, 48, 50, respectively. In addition, coating and drying system 10 may also include electrical discharge devices, such as corona or glow discharge device 52, or polar charge assist device 54, to modify the substrate 12 prior to application of the coating.

Figure 2:
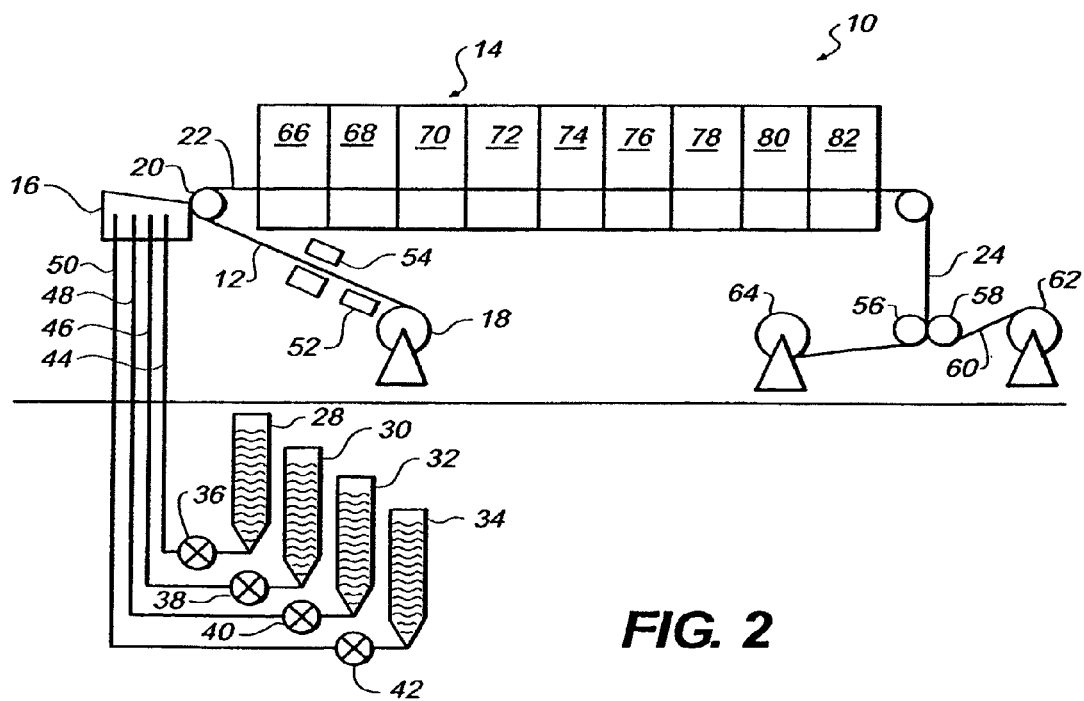
FIG. 2 is a schematic of an exemplary coating and drying apparatus as in FIG. 1 but also including a station where an alternate winding operation further comprises application of a strippable protection layer.

Turning next to FIG. 2 there is shown a schematic of the same exemplary coating and drying system 10 depicted in FIG. 1 with an alternative winding operation to apply a strippable protection layer. Accordingly, the figures are numbered identically up to the winding operation. In the practice of the present invention the guarded cover sheet composite 24 comprising a carrier substrate (which may be a resin film, paper, resin-coated paper, or metal) with a cover sheet applied thereto is taken between opposing nip rollers 56, 58. The guarded cover sheet composite 24 is adhesively adhered or electrostatically adhered to a preformed strippable protection layer 60 which is supplied from unwinding station 62 and the guarded cover sheet composite containing the preformed strippable protection layer 60 is wound into rolls at wind-up station 64. In a preferred embodiment of the present invention, polyolefin or polyethylene phthalate (PET) is used as the preformed strippable protection layer 60. Either the guarded cover sheet composite 24 or the protection layer 60 may be pretreated with an electric charge generator to enhance the electrostatic attraction of the protection layer 60 to the guarded cover sheet composite 24.

The coating apparatus 16 used to deliver coating fluids to the moving substrate 12 may be a multi-layer applicator such as a slide bead hopper, as taught for example in U.S. Pat. No. 2,761,791 to Russell, or a slide curtain hopper, as taught by U.S. Pat. No. 3,508,947 to Hughes. Alternatively, the coating apparatus 16 may be a single layer applicator, such as slot die bead hopper or jet hopper. In a preferred embodiment of the present invention, the coating apparatus 16 is a multi-layer slide bead hopper.

As shown in FIGS. 1 and 2, coating and drying system 10 includes a dryer 14 that will typically be a drying oven to remove solvent from the coated film. An exemplary dryer 14 used in the practice of the method of the present invention includes a first drying section 66 followed by eight additional drying sections 68-82 capable of independent control of temperature and air flow. Although dryer 14 is shown as having nine independent drying sections, drying ovens with fewer compartments are well known and may be used to practice the method of the present invention. In a preferred embodiment of the present invention the dryer 14 has at least two independent drying zones or sections.

Preferably, each of drying sections 66-82 has independent temperature and airflow controls. In each section, temperature may be adjusted between 5° C. and 150° C. To minimize drying defects from case hardening or skinning-over of the wet layers, optimum drying rates are needed in the early sections of dryer 14. There are a number of artifacts created when temperatures in the early drying zones are inappropriate. For example, fogging or blush of cellulose acetate films is observed when the temperature in zones 66, 68 and 70 are set at 25° C. This blush defect is particularly problematic when high vapor pressures solvents (methylene chloride and acetone) are used in the coating fluids. Aggressively high temperatures of 95° C. in the early drying sections 66, 68, and 70 tend to cause premature delamination of the cover sheet from the carrier substrate. Higher temperatures in the early drying sections are also associated with other artifacts such as case hardening, reticulation patterns and blistering of the cover sheet.

In a preferred embodiment of the present invention, the first drying section 66 is operated at a temperature of at least about 25° C. but less than 95° C. with no direct air impingement on the wet coating of the coated substrate 22. In another preferred embodiment of the method of the present invention, drying sections 68 and 70 are also operated at a temperature of at least about 25° C. but less than 95° C. It is preferred that initial drying sections 66, 68 be operated at temperatures between about 30° C. and about 60° C. It is most preferred that initial drying sections 66, 68 be operated at temperatures between about 30° C. and about 50° C. The actual drying temperature in drying sections 66, 68 may optimize empirically within these ranges by those skilled in the art.

Figure 3:
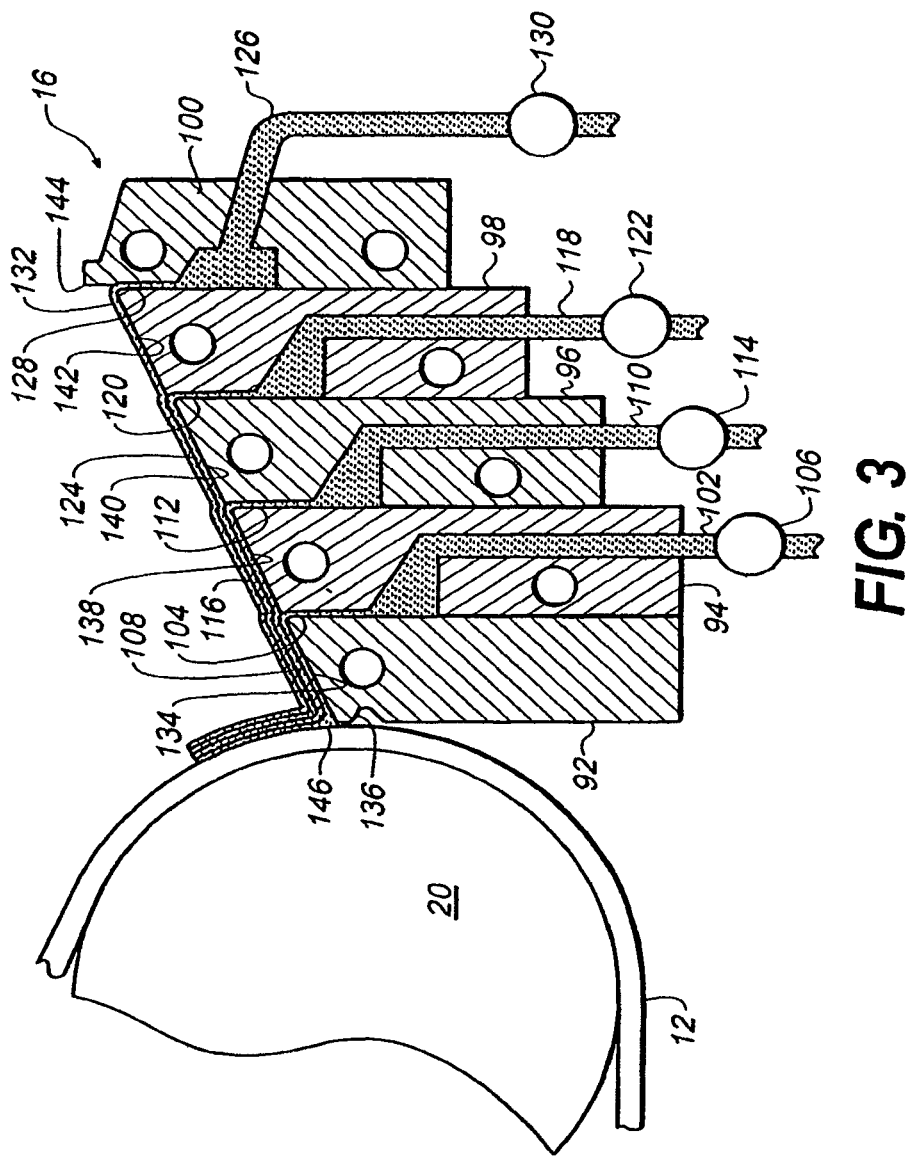
FIG. 3 is a schematic of an exemplary multi-slot coating apparatus that can be used in the practice of the present invention.

Referring now to FIG. 3, a schematic of an exemplary coating apparatus 16 is shown in detail. Coating apparatus 16, schematically shown in side elevational cross-section, includes a front section 92, a second section 94, a third section 96, a fourth section 98, and a back plate 100. There is an inlet 102 into second section 94 for supplying coating liquid to first metering slot 104 via pump 106 to thereby form a lowermost layer 108. There is an inlet 110 into third section 96 for supplying coating liquid to second metering slot 112 via pump 114 to form layer 116. There is an inlet 118 into fourth section 98 for supplying coating liquid to metering slot 120 via pump 122 to form layer 124. There is an inlet 126 into back plate 100 for supplying coating liquid to metering slot 128 via pump 130 to form layer 132. Each slot 104, 112, 120, 128 includes a transverse distribution cavity. Front section 92 includes an inclined slide surface 134, and a coating lip 136. There is a second inclined slide surface 138 at the top of second section 94. There is a third inclined slide surface 140 at the top of third section 96. There is a fourth inclined slide surface 142 at the top of fourth section 98. Back plate 100 extends above inclined slide surface 142 to form a back land surface 144. Residing adjacent the coating apparatus or hopper 16 is a coating back-up roller 20 about which a web 12 is conveyed. Coating layers 108, 116, 124, 132 form a multi-layer composite sheet which forms a coating bead 146 between lip 136 and substrate 12. Typically, the coating hopper 16 is movable from a non-coating position toward the coating back-up roller 20 and into a coating position. Although coating apparatus 16 is shown as having four metering slots, coating dies having a larger number of metering slots (as many as nine or more) are well known and may be used to practice the method of the present invention.

For the purpose of the present invention, the coating fluids for the low birefringence protective polymer film are comprised principally of a polymer binder dissolved in an organic solvent. In a particularly preferred embodiment, the low birefringence protective polymer film is a cellulose ester. These are commercially available in a variety of molecular weight sizes as well as in the type and degree of alkyl substitution of the hydroxyl groups on the cellulose backbone. Examples of cellulose esters include those having acetyl, propionyl and butyryl groups. Of particular interest is the family of cellulose esters with acetyl substitution known as cellulose acetate. Of these, the fully acetyl substituted cellulose having a combined acetic acid content of approximately 58.0-62.5% is known as triacetyl cellulose (TAC) and is generally preferred for preparing cover sheets used in electronic displays.

In terms of organic solvents for TAC, suitable solvents, for example, include chlorinated solvents (methylene chloride and 1,2 dichloroethane), alcohols (methanol, ethanol, n-propanol, isopropanol, n-butanol, isobutanol, diacetone alcohol, and cyclohexanol), ketones (acetone, methylethyl ketone, methylisobutyl ketone, and cyclohexanone), esters (methyl acetate, ethyl acetate, n-propyl acetate, isopropyl acetate, isobutyl acetate, n-butyl acetate, and methylacetoacetate), aromatics (toluene and xylenes) and ethers (1,3-dioxolane, 1,2-dioxolane, 1,3-dioxane, 1,4-dioxane, and 1,5-dioxane). In some applications, small amounts of water may be used. Normally, TAC solutions are prepared with a blend of one or more the aforementioned solvents. Preferred primary solvents include methylene chloride, acetone, methyl acetate, and 1,3-dioxolane. Preferred co-solvents for use with the primary solvents include methanol, ethanol, n-butanol. and water.

Coating formulations may also contain plasticizers. Appropriate plasticizers for TAC films include phthalate esters (dimethylphthalate, dimethoxyethyl phthalate, diethylphthalate, dibutylphthalate, dioctylphthalate, didecylphthalate and butyl octylphthalate), adipate esters (dioctyl adipate), phosphate esters (tricresyl phosphate, biphenylyl diphenyl phosphate, cresyl diphenyl phosphate, octyl diphenyl phosphate, tributyl phosphate, and triphenyl phosphate), and glycolic acid esters (triacetin, tributyrin, butyl phthalyl butyl glycolate, ethyl phthalyl ethyl glycolate, and methyl phthalyl ethyl glycolate). Non-aromatic ester plasticizers as described in commonly assigned co-pending U.S. patent application Ser. No. 10/945,305, filed Sep. 20, 2004. Plasticizers are normally used to improve the physical and mechanical properties of the final film. In particular, plasticizers are known to improve the flexibility and dimensional stability of cellulose acetate films. However, plasticizers are also used here as coating aids in the converting operation to minimize premature film solidification at the coating hopper and to improve drying characteristics of the wet film. In the method of the present invention, plasticizers are used to minimize blistering, curl and delamination of TAC films during the drying operation. In a preferred embodiment of the present invention, plasticizers are added to the coating fluid at a total concentration of up to 50% by weight relative to the concentration of polymer in order to mitigate defects in the final TAC film.

As indicated above, a significant aspect of the present invention is that the protective cover sheet comprising a low birefringence protective polymer film, in additional, and one or more relatively thin functional layers in addition to the low birefringence protective polymer and preferably coated thereon, which functional layer or layers are either adjacent or non-adjacent each other, wherein the one or more functional layers comprise at least an adhesion-promoting layer for adhering a poly(vinyl alcohol)-containing film to said low birefringence protective polymer film, and wherein at least one of said one or more functional layers comprises a UV-absorbing polymer. The UV-absorbing polymer may be in the adhesion-promoting layer.

Preferably, in one embodiment of the invention, the UV-absorbing polymer is in the form of particles, for example a latex, having a mean particle size of between 10 and 500 nanometers, more preferably having a mean particle size of between 10 and 150 nanometers. The UV-absorbing polymer can be water dispersible or soluble in an organic solvent.

Furthermore, the UV-absorbing polymer in one embodiment has a weight average molecular weight of greater than 10,000, preferably greater than 100,000 to up 5,000,0000 if uncrosslinked, and can optionally be crosslinked.

The UV-absorbing polymer preferably comprise greater than 20 wt. % of the functional layer comprising the UV-absorbing polymer.

The UV-absorbing polymer can suitably be selected from polymers comprising a structural unit having UV absorption capacity. Examples include, but are not limited to, 2-hydroxybenzophenone derivatives including 2-hydroxy-4-methoxybenzophenone, 2-hydroxy-4-octoxybenzophenone, 2-hydroxy-4-dodecyloxybenzophenone, 2-hydroxy-4-methoxy-5-sulfobenzophenone, 2,4-dihydroxybenzophenone, 2,2'-dihydroxy-4,4'-dimethoxybenzophenone, bis(2-methoxy-4-hydroxy-5-benzoylphenyl)methane, 2-hydroxy-4-acryloyloxybenzophenone, 2-hydroxy-4-methacryloyloxybenzophenone, 2-hydroxy-4-(2-acryloyloxy)ethoxybenzophenone, 2-hydroxy-4-(2-methacryloyloxy)ethoxybenzophenone, 2-hydroxy-4-(2-methyl-2-acryloyloxy)ethoxybenzophenone, and the like; 2-hydroxybenzotriazole derivatives including 2-(2'-hydroxy-5'-methylphenyl)benzotriazole, 2-(2'-hydroxy-5'-t-butylphenyl)benzotriazole, 2-(2'-hydroxy-5'-3',5'-di-t-butylphenyl)benzotriazole, 2-(2'-hydroxy-3'-t-butyl-5'-methylphenyl)-5-chlorobenzotriazole, 2-(2'-hydroxy-3'-5'-di-t-amylphenyl)benzotriazole, 2-{2'-hydroxy-3'-(3",4",5",6"-tetrahydrophthalimidomethyl)-5'-methylphenyl}benzotriazole, 2,2-methylenebis {4-(1,1,3,3-tetramethylbutyl)-6-(2H-benzotriazole-2-yl)phenol}, 2-{2'-hydroxy-5'-(methacryloyloxy)phenyl}benzotriazole, 2-[2'-hydroxy-5'-(acryloyloxy)phenyl]benzotriazole, 2-[2'-hydroxy-3'-t-butyl-5'-(methacryolyoxy)phenyl]benzotriazole, 2-[2'-hydroxy-3'-methyl-5'-(acryloyloxy)phenyl]benzotriazole, 2-{2'-hydroxy-5'-(methacryloyloxypropyl)phenyl}-5-chlorobenzotriazole, 2-[2'-hydroxy-5'-(methacryloyoxyethyl)phenyl]benzotriazole, 2-[2'-hydroxy-5'-(acryloyloxyethyl)phenyl]benzotriazole, 2-[2'-hydroxy-3'-t-butyl-5'-(methacryloxyethyl)phenyl]benzotriazole, 2-[2'-hydroxy-3'-methyl-5'-(acryloyloxyethyl)phenyl]benzotriazole, 2-[2'-hydroxy-5'-(methacryloyloxypropyl)phenyl]-5-chlorobenzotrialoe, 2-[2'-hydroxy-5'-(acryloyloxybutyl)phenyl]-5-methylbenzotriazole, [2-hydroxy-3-t-butyl-5-(acryloyloxyethoxycarbonylethyl)phenyl]benzotriazole, and the like; salicylic acid derivatives such as phenyl salicylate, p-t-butylphenyl salicylate, p-octylphenyl salicylate, and the like.

Preferably the UV-absorbing polymer has a maximum absorption wavelength in the range of 300 to 400 nm.

Preferably the UV-absorbing polymer is a copolymer that is the reaction product of a mixture of the UV-absorbing vinyl monomer with one or more co-polymerizable compatible vinyl monomers, wherein the UV-absorbing vinyl monomer comprises a structural unit having UV absorption capacity as described above. The co-polymerizable vinyl monomers can include, for example, an acrylic acid, an alkylacrylacid (such as methacrylic acid, etc.), an ester or amide derived from an acrylic acid (for example, acrylamide, methacrylamide, n-butylacrylamide, t-butylacrylamide, diacetone acrylamide, methyl acrylate, ethyl acrylate, n-propylacrylate, n-butyl acrylate, t-butyl acrylate, isobutyl acrylate, 2-ethylhexyl acrylate, n-octyl acrylate, lauryl acrylate, 2-ethoxyethyl acrylate, 2-methoxyethyl acrylate, methyl methacrylate, ethyl methacrylate, n-butyl methacrylate, b-hydroxyl methacrylate, etc.), a vinyl ester (for example, vinyl acetate, vinyl propionate, vinyl laurate, etc.), acrylonitrile, methacrylonitrile, an aromatic vinyl compound (for example, styrene and a derivative thereof, for example, vinyl toluene, divinylbenzene, vinyl acetophenone, sulfostyrene, etc.), iraconic acid, citraconic acid, crotonic acid, vinylidene chloride, a vinyl alkyl ether (for example, vinyl ethyl ether, etc.), an ester of maleic acid, N-vinyl-2-pyrrolidone, N-vinylpyridine, 2- or 4-vinylpyridine, etc., an sulfonic acid containing monomers, (for example, acrylamido-2,2'-dimethylpropane sulfonic acid, 2-sulfoethyl methacrylate, 3-sulfopropyl methacylate, etc.). Of these monomers, esters of acrylic acid, esters of methacrylic acid, and aromatic vinyl compounds are preferred. Specific examples of preferred comonomers include: butyl acrylate; 2-ethylhexyl acrylate; 2-ethoxyethyl acrylate; 2-methoxyethyl acrylate; acrylic acid; methacrylic acid; acrylamide; 2-hydroxyethyl acrylate; vinyl acetate; styrene; N-vinyl-2-pyrrolidone; 2-sulfoethyl methacrylate and its metal salts; and 2-acrylamido-2-methyl propane sulfonic acid and its metal salts.

In a preferred embodiment of the invention, the polymeric UV-absorbing material comprises the following repeating units:

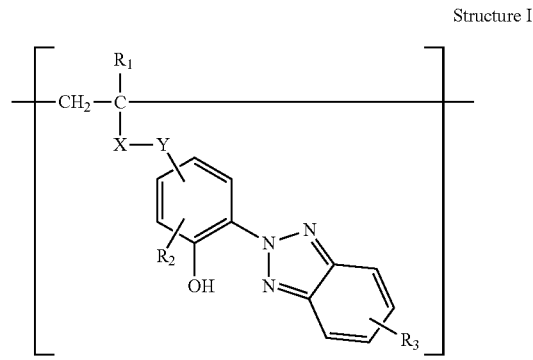

Structure I wherein:

$R_1$ represents H or $CH_3$;

$R_2$ represents H, halogen, alkoxy or a straight chain or branched alkyl group having from 1 to about 8 carbon atoms;

$R_3$ represents H, Cl, alkoxy or an alkyl group having from 1 to about 4 carbon atoms;

X represents COO, CONH or aryl; and

Y represents an alkylene group having from about 2 to about 10 carbon atoms or $(CH_2)_n O$ wherein n is 1 to about 4.

One preferred embodiments of the UV-absorbing polymer is represented by Structure 1 wherein $R_1$ represents $CH_3$; $R_2$ represents H; $R_3$ represents H; X represents COO; and Y represents $CH_2CH_2$.

In another preferred embodiment, the UV-absorbing polymer is represented by Structure I wherein $R_1$ represents H; $R_2$ represents H; $R_3$ represents Cl; X represents COO; and Y represents $CH_2CH_2CH_2$.

Specific examples of polymeric UV-absorbing repeating units useful in the invention include the following:

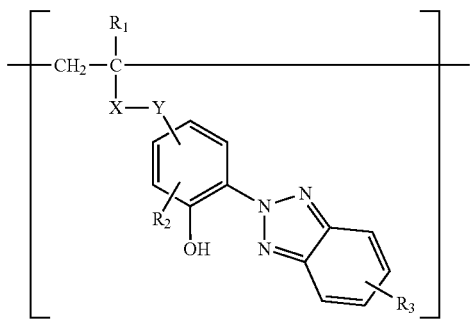

wherein the groups are as specified in Table 1 below.

The UV absorbing repeating units illustrated in Table 1 above can also be polymerized in the presence of two or more comonomers. For example, a combination of ethyl acrylate and acrylamido-2,2'-dimethyl propane sulfonic acid monomers can be copolymerized with UV absorbing repeating unit UV-1 above. Specific examples of polymeric UV absorbing materials useful for this invention are summarized below:
UVL-1: poly-(UV-1)-co-ethyl acrylate-co-2-sulfo-1,1-dimethylethylacrylamide, sodium salt (1:1:0.05 molar ratio);
UVL-2: poly-(UV-2)-co-ethyl acrylate-2-sulfo-1,1-dimethylacrylamide, sodium salt (1:1:0.05 molar ratio); and
UVL-3: poly-(UV-3)-co-butyl acrylate-co-2-sulfo-1,1dimethylethyl acrylamide sodium salt (1:2:0.05 molar ratio).

The polymeric UV-absorbing materials employed in the invention can be used in an amount of from 0.05 to about 4.0 $g/m^2$, preferably from about 0.20 to about 1.5 $g/m^2$.

As indicated above, the functional layer comprising the UV-absorbing polymer is an adhesion-promoting layer for adhering a poly(vinyl alcohol)-containing film to said low birefringence protective polymer film. Alternatively, the functional layer comprising the UV-absorbing polymer is a tie layer between said low birefringence protective polymer film and said layer promoting adhesion to poly(vinyl alcohol)-containing films. In yet another embodiment, both the adhesion-promoting layer and the tie layer comprise a UV-absorbing polymer which may be the same or different. As

TABLE I

| UV-Absorber | $R_1$ | $R_2$ | $R_3$ | X | Y |
|---|---|---|---|---|---|
| UV-1 | $CH_3$ | H | H | COO | $(CH_2)_2$ |
| UV-2 | H | H | Cl | COO | $(CH_2)_3$ |
| UV-3 | H | H | H | ⌬ | $CH_2O$ |
| UV-4 | $CH_3$ | $C(CH_3)_3$ | H | COO | $(CH_2)_3$ |
| UV-5 | H | $CH_3$ | H | CONH | $CH_2$ |
| UV-6 | H | $CH_3$ | $OCH_3$ | CONH | $CH_2$ |
| UV-7 | H | $C(CH_3)_3$ | Cl | CONH | $CH_2$ |
| UV-8 | $CH_3$ | H | H | COO | $(CH_2)_2OCONH$ |
| UV-9 | $CH_3$ | Cl | H | COO | $H_2C\!-\!\underset{\underset{OH}{\mid}}{CH}\!-\!CH_2O$ |
| UV-10 | $CH_3$ | H | Cl | COO | $(CH_2)_3$ |
| UV-11 | H | H | Cl | COO | $(CH_2)_3$ |
| UV-12 | $CH_3$ | H | Cl | COO | $(CH_2)_2\!-\!O\!-\!\overset{O}{\underset{\|}{C}}\!-\!(CH_2)_2$ |
| UV-13 | H | H | Cl | COO | $(CH_2)_2\!-\!O\!-\!\overset{O}{\underset{\|}{C}}\!-\!(CH_2)_2$ |
| UV-14 | $CH_3$ | H | Cl | COO | $(CH_2)_2\!-\!NH\!-\!\overset{O}{\underset{\|}{C}}\!-\!(CH_2)_2$ |
| UV-15 | H | $CH_3$ | H | ⌬ | $CH_2$ |
| UV-16 | H | $CH_3$ | Cl | COO | $(CH_2)_3$ |
| UV-17 | H | $CH_3$ | H | COO | $(CH_2)_2$ |
| UV-18 | $CH_3$ | H | Cl | COO | $(CH_2)_2O$ |
| UV-19 | H | H | Cl | COO | $(CH_2)_2$ | indicated above, the adhesion-promoting layer can further comprises a crosslinking compound for the UV absorbing polymer in another functional layer comprising the UV-absorbing polymer.

The low birefringence protective polymer film comprises one or more low molecular weight UV-absorbing non-polymeric or polymeric compounds. Such compounds can be non-polymeric or have a molecular weight less than 500, preferably less than 350.

The coating formulation for the low birefringence protective polymer film itself may also contain one or more UV absorbing compounds to provide UV filter element performance and/or act as UV stabilizers for the low birefringence protective polymer film. Ultraviolet absorbing compounds are generally contained in the polymer in an amount of 0.01 to 20 weight parts based on 100 weight parts of the polymer containing no ultraviolet absorber, and preferably contained in an amount of 0.01 to 10 weight parts, especially in an amount of 0.05 to 2 weight parts. Any of the various ultraviolet light absorbing compounds which have been described for use in various polymeric elements may be employed in the polymeric elements of the invention, such as hydroxyphenyl-s-triazine, hydroxyphenylbenzotriazole, formamidine, or benzophenone compounds. As described in commonly assigned U.S. Pat. No. 6,872,766, hereby incorporated by reference, the use of dibenzoylmethane ultraviolet absorbing compounds in combination with a second UV absorbing compound such as those listed above have been found to be particularly advantageous with respect to providing both a sharp cut off in absorption between the UV and visible light spectral regions as well as increased protection across more of the UV spectrum. Additional possible UV absorbers which may be employed include salicylate compounds such as 4-t-butylphenylsalicylate; and [2,2'-thiobis-(4-t-octylphenolate)]n-butylamine nickel(II). Most preferred are combinations of dibenzoylmethane compounds with hydroxyphenyl-s-triazine or hydroxyphenylbenzotriazole compounds.

Dibenzoylmethane ultraviolet absorbing compounds which may be employed include those of the formula (M-I):

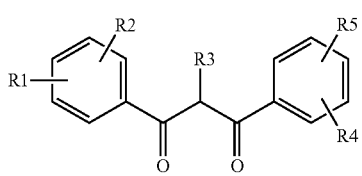

(M-I)

where R1 through R5 are each independently hydrogen, halogen, nitro, or hydroxyl, or further substituted or unsubstituted alkyl, alkenyl, aryl, alkoxy, acyloxy, ester, carboxyl, alkyl thio, aryl thio, alkyl amine, aryl amine, alkyl nitrile, aryl nitrile, arylsulfonyl, or 5-6 member heterocycle ring groups. Preferably, each of such groups comprises 20 or fewer carbon atoms. Further preferably, R1 through R5 of Formula IV are positioned in accordance with Formula I-A:

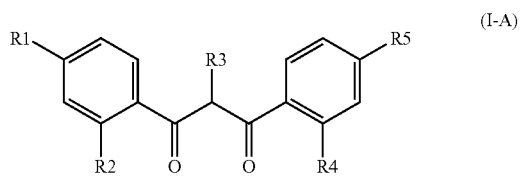

(I-A)

Particularly preferred are compounds of Formula I-A where R1 and R5 represent alkyl or alkoxy groups of from 1-6 carbon atoms and R2 through R4 represent hydrogen atoms.

Representative compounds of Formula (I-A) which may be employed in accordance with the elements of the invention include the following:

(IV-1): 4-(1,1-dimethylethyl)-4'-methoxydibenzoylmethane (PARSOL 1789);

(IV-2): 4-isopropyl dibenzoylmethane (EUSOLEX 8020); and (IV-3): dibenzoylmethane (RHODIASTAB 83).

Hydroxyphenyl-s-triazine ultraviolet absorbing compounds which may be used in the elements of the invention, e.g., may be a derivative of tris-aryl-s-triazine compounds as described in U.S. Pat. No. 4,619,956. Such compounds may be represented by Formula II:

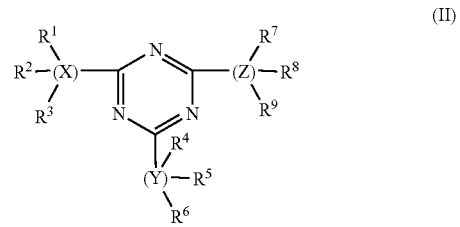

(II)

wherein X, Y and Z are each aromatic, carbocylic radicals of less than three 6-membered rings, and at least one of X, Y and Z is substituted by a hydroxy group ortho to the point of attachment to the triazine ring; and each of R1 through R9 is selected from the group consisting of hydrogen, hydroxy, alkyl, alkoxy, sulfonic, carboxy, halo, haloalkyl and acylamino. Particularly preferred are hydroxyphenyl-s-triazines of the formula II-A:

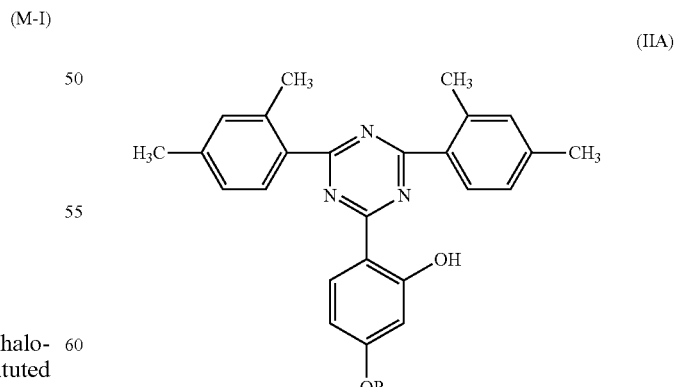

(IIA)

wherein R is hydrogen or alkyl of 1-18 carbon atoms.

Hydroxyphenylbenzotriazole compounds which may be used in the elements of the invention, e.g., may be a derivative of compounds represented by Formula III:

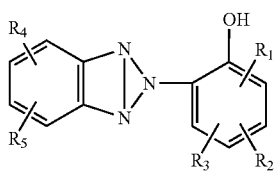

(III)

wherein R1 through R5 may be independently hydrogen, halogen, nitro, hydroxy, or further substituted or unsubstituted alkyl, alkenyl, aryl, alkoxy, acyloxy, aryloxy, alkylthio, mono or dialkyl amino, acyl amino, or heterocyclic groups. Specific examples of benzotriazole compounds which may be used in accordance with the invention include 2-(2'-hydroxy-3'-t-butyl-5'-methylphenyl)-5-chlorobenzotriazole; 2-(2'-hydroxy-3',5'-di-t-amylphenyl)benzotriazole; octyl 5-tert-butyl-3-(5-chloro-2H-benzotriazole-2-yl)-4-hydroxybenzenepropionate; 2-(hydroxy-5-t-octylphenyl)benzotriazole; 2-(2'-hydroxy-5'-methylphenyl)benzotriazole; 2-(2'-hydroxy-3'-dodecyl-5'-methylphenyl)benzotriazole; and 2-(2'-hydroxy-3',5'-di-t-butylphenyl)-5-chlorobenzotriazole.

Formamidine ultraviolet absorbing compounds which may be used in the elements of the invention, e.g., may be a formamidine compound as described in U.S. Pat. No. 4,839,405. Such compounds may be represented by Formula IV or Formula V:

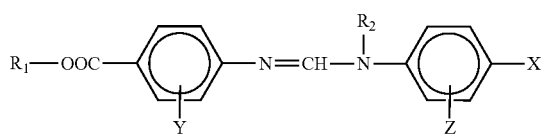

(IV)

wherein R1 is an alkyl group containing 1 to about 5 carbon atoms; Y is a H, OH, Cl or an alkoxy group; R2 is a phenyl group or an alkyl group containing 1 to about 9 carbon atoms; X is selected from the group consisting of H, carboalkoxy, alkoxy, alkyl, dialkylamino and halogen; and Z is selected from the group consisting of H, alkoxy and halogen;

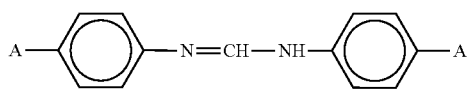

(V)

wherein A is —COOR, —COOH, —CONR'R'', —NR'COR, —CN, or a phenyl group; and wherein R is an alkyl group of from 1 to about 8 carbon atoms; R' and R'' are each independently hydrogen or lower alkyl groups of from 1 to about 4 carbon atoms. Specific examples of formamidine compounds which may be used in accordance with the invention include those described in U.S. Pat. No. 4,839,405, and specifically 4-[[(methylphenylamino)methylene]amino]-ethyl ester.

Benzophenone compounds which may be used in the elements of the invention, e.g., may include 2,2'-dihydroxy-4, 4'dimethoxybenzophenone, 2-hydroxy-4-methoxybenzophenone, and 2-hydroxy-4-n-dodecyloxybenzophenone.

Coating formulations may also contain surfactants as coating aids to control artifacts related to flow after coating. Artifacts created by flow after coating phenomena include mottle, repellencies, orange-peel (Bernard cells), and edge-withdraw. Surfactants used control flow after coating artifacts include siloxane and fluorochemical compounds. Examples of commercially available surfactants of the siloxane type include: (1) Polydimethylsiloxanes such as DC200 Fluid from Dow Corning; (2) Poly(dimethyl, methylphenyl)siloxanes such as DC510 Fluid from Dow Corning; (3) Polyalkyl substituted polydimethysiloxanes such as DC190 and DC1248 from Dow Corning as well as the L7000 SILWET series (L7000, L7001, L7004 and L7230) from Union Carbide; and (4) Polyalkyl substituted poly(dimethyl, methylphenyl)siloxanes such as SF1023 from General Electric. Examples of commercially available fluorochemical surfactants include: (1) Fluorinated alkyl esters such as the FLUORAD series (FC430 and FC431) from the 3M Corporation; (2) Fluorinated polyoxyethylene ethers such as the ZONYL series (FSN, FSN100, FSO, FSO100) from DuPont; (3) Acrylate:polyperfluoroalkyl ethylacrylates such as the F series (F270 and F600) from NOF Corporation; and (4) Perfluoroalkyl derivatives such as the SURFLON series (S383, S393, and S8405) from the Asahi Glass Company. In the method of the present invention, surfactants are generally of the non-ionic type. In a preferred embodiment of the present invention, non-ionic compounds of either the siloxane or fluorinated type are added to the uppermost layers.

In terms of surfactant distribution, surfactants are most effective when present in the uppermost layers of the multi-layer coating. In the uppermost layer, the concentration of surfactant is preferably 0.001-1.000% by weight and most preferably 0.010-0.500%. In addition, lesser amounts of surfactant may be used in the second uppermost layer to minimize diffusion of surfactant into the lowermost layers. The concentration of surfactant in the second uppermost layer is preferably 0.000-0.200% by weight and most preferably between 0.000-0.100% by weight. Because surfactants are only necessary in the uppermost layers, the overall amount of surfactant remaining in the final dried film is small.

Although surfactants are not required to practice the method of the current invention, surfactants do improve the uniformity of the coated film. In particular, mottle non-uniformities are reduced by the use of surfactants. In transparent cellulose acetate films, mottle non-uniformities are not readily visualized during casual inspection. To visualize mottle artifacts, organic dyes may be added to the uppermost layer to add color to the coated film. For these dyed films, non-uniformities are easy to see and quantify. In this way, effective surfactant types and levels may be selected for optimum film uniformity.

Figure 4:
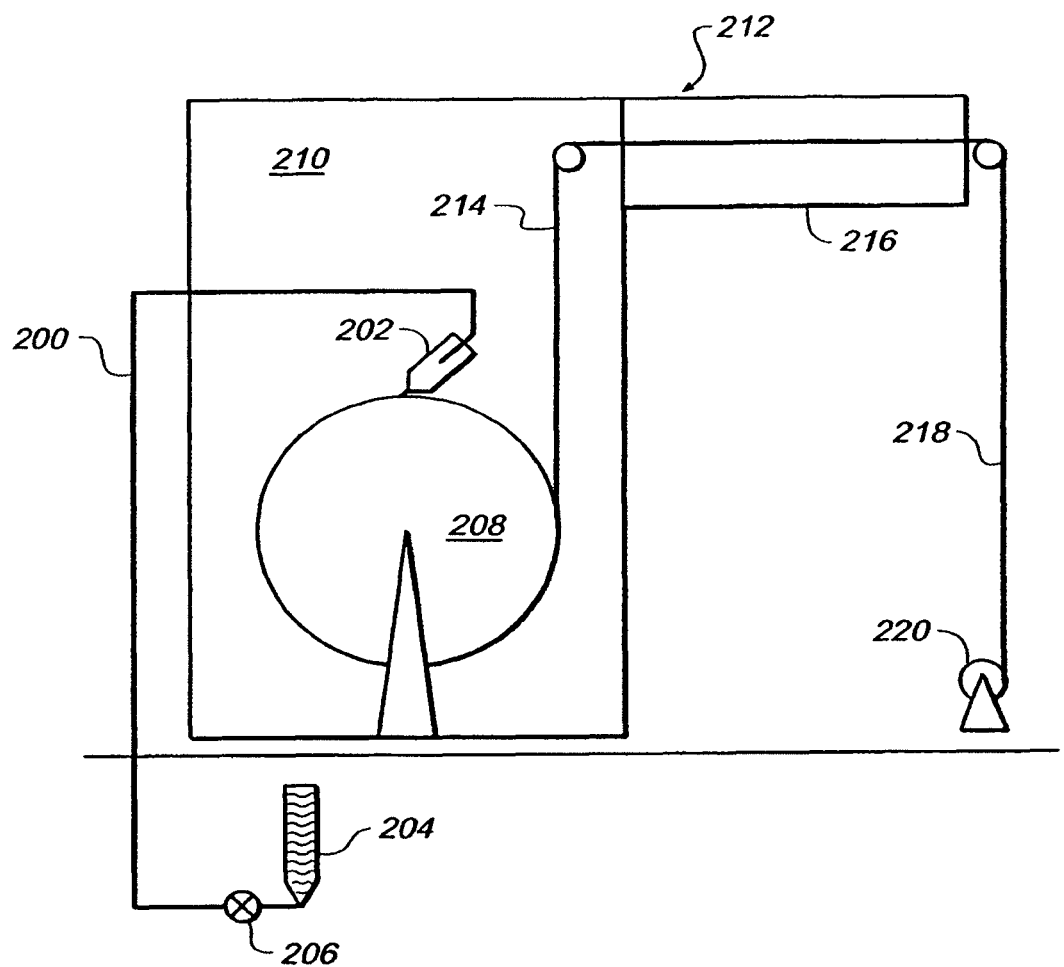
FIG. 4 is a schematic of an exemplary casting apparatus that can be used in the practice of the present invention.

As an alternative to the exemplary coating method and apparatus of FIG. 3 for making the low birefringence protective polymer film, a casting method and apparatus can be used. Turning now to FIG. 4 there is shown a schematic of an exemplary casting and drying system suitable for preparing the cover sheets of the present invention. A viscous dope comprising a low birefringence protective polymer is delivered through a feed line 200 to an extrusion hopper 202 from a pressurized tank 204 by a pump 206. The dope is cast onto a highly polished metal drum 208 located within a first drying section 210 of the drying oven 212. The cast polymer film 214 is allowed to partially dry on the moving metal drum 208 and is then peeled from the metal drum 208. The cast polymer film 214 is then conveyed to a final drying section 216 to remove the remaining solvent. The final dried low birefringence protective polymer film 218 is then wound into rolls at a wind-up station 220. The cast polymer film typically has a thickness in the range of from 40 to 200 μm.

Coating methods such as illustrated in FIG. 3 are distinguished from casting methods such as illustrated in FIG. 4 by the process steps necessary for each technology. These process steps in turn affect a number of tangibles such as fluid viscosity, converting aids, substrates, and hardware that are unique to each method. In general, coating methods involve application of dilute low viscosity liquids to thin flexible substrates, evaporating the solvent in a drying oven, and winding the dried film/substrate composite into rolls. In contrast, casting methods involve applying a concentrated viscous dope to a highly polished metal drum or band, partially drying the wet film on the metal substrate, stripping the partially dried film from the substrate, removing additional solvent from the partially dried film in a drying oven, and winding the dried film into rolls. In terms of viscosity, coating methods require very low viscosity liquids of less than 5,000 cp. In the present invention the viscosity of the coated liquids will generally be less than 2000 cp and most often less than 1500 cp. Moreover, in the coating method the viscosity of the lowermost layer is preferred to be less than 200 cp. and most preferably less than 100 cp. for high speed coating application. In contrast, casting methods require highly concentrated dopes with viscosity on the order of 10,000-100,000 cp for practical operating speeds. In terms of converting aids, coating methods generally involve the use of surfactants as converting aids to control flow after coating artifacts such as mottle, repellencies, orange peel, and edge withdraw. In contrast, casting methods do not require surfactants. Instead, converting aids are only used to assist in the stripping operation in casting methods. For example, n-butanol is sometimes used as a converting aid in casting TAC films to facilitate stripping of the TAC film from the metal drum. In terms of substrates, coating methods generally utilize thin (10-250 µm) flexible supports. In contrast, casting methods employ thick (1-100 mm), continuous, highly polished metal drums or rigid bands. As a result of these differences in process steps, the hardware used in coating is conspicuously different from those used in casting as can be seen by a comparison of the schematics shown in FIGS. 1 and 4, respectively.

The invention is also directed to a guarded cover sheet composite comprising a carrier substrate and a multilayer protective cover sheet comprising a low birefringence protective polymer film and one or more functional layers, which layers are either adjacent or non-adjacent, wherein the one or more functional layers comprise at least an adhesion-promoting layer, for adhering a poly(vinyl alcohol)-containing film, on the same side of said carrier substrate as the low birefringence polymer film to said low birefringence protective polymer film, and wherein at least one of said one or more functional layers comprise a UV-absorbing polymer which may be the same or different than the adhesion-promoting layer. The preparation of the cover sheet or the guarded cover sheet composite of the present invention may also include the step of coating over a previously prepared (by coating or casting process) film. For example, the coating and drying system 10 shown in FIGS. 1 and 2 may be used to apply a second film or multi-layer film to an existing low birefringence protective polymer film or cover sheet composite. If the film or cover sheet composite is wound into rolls before applying the subsequent coating, the process is called a multi-pass coating operation. If coating and drying operations are carried out sequentially on a machine with multiple coating stations and drying ovens, then the process is called a tandem coating operation. In this way, thick low birefringence protective polymer films may be prepared at high line speeds without the problems associated with the removal of large amounts of solvent from a very thick wet film. Alternatively, many different cover sheet configurations having various combinations of auxiliary layers applied via a tandem or multi-pass coating operation may be prepared. Moreover, the practice of multi-pass or tandem coating also has the advantage of minimizing other artifacts such as streak severity, mottle severity, and overall film non-uniformity.

Figure 5:
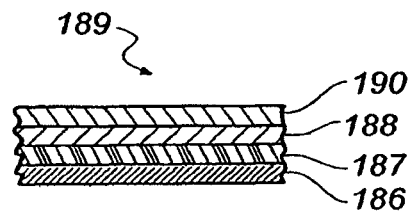
FIG. 5 shows a cross-sectional representation of a three-layer cover sheet of the invention.

Turning next to FIGS. 5 through 8, there are presented cross-sectional illustrations showing various cover sheet and guarded cover sheet composite configurations possible with the present invention. FIG. 5 shows a cover sheet 189 having lowermost layer 186, intermediate layers 187 and 188, and uppermost layer 190. In this illustration, layer 186 could be a layer promoting adhesion to PVA, 187 could be a tie layer, layer 188 could be a low birefringence protective polymer film, and layer 190 could be an auxiliary layer such as a viewing angle compensation layer, moisture barrier layer, abrasion resistant layer, or other type of auxiliary layer, for example. The cover sheet may be prepared by conventional casting methods or by coating methods employing a carrier substrate as described hereinabove.

Figure 6:
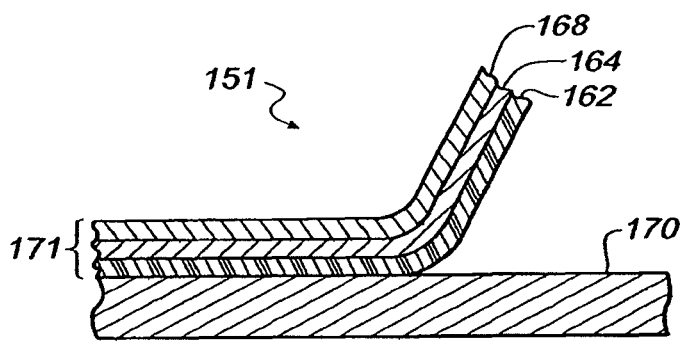
FIG. 6 shows a cross-sectional representation of a guarded cover sheet of the invention comprising a three-layer cover sheet and a partially peeled carrier substrate.

In FIG. 6, a guarded cover sheet composite 151 comprising a three-layer cover sheet 171 having lower-most layer 162, intermediate layer 164, and uppermost layer 168 is shown partially peeled from a carrier substrate 170. In this illustration, layer 162 could be a layer promoting adhesion to PVA, layer 164 could be a tie layer, and layer 168 could be a low birefringence protective polymer film. Layers 162, 164, and 168 may be formed either by applying and drying three separate liquid layers on the carrier substrate 170 or by simultaneously applying two or all three of the layers and then drying those simultaneously applied layers in a single drying operation.

In a preferred embodiment, the layer promoting adhesion to PVA is coated and dried separately from the tie layer and low birefringence protective polymer film using a water-based coating formulation. When a cover sheet 171 is prepared by coating onto a carrier substrate 170 as illustrated in FIG. 6, it is generally preferred that the layer promoting adhesion to PVA is coated onto the carrier substrate 170 and then dried, prior to application of the low birefringence protective polymer film. Auxiliary layers may be applied either simultaneously with the low birefringence protective polymer film or in a subsequent coating and drying operation.

Figure 7:
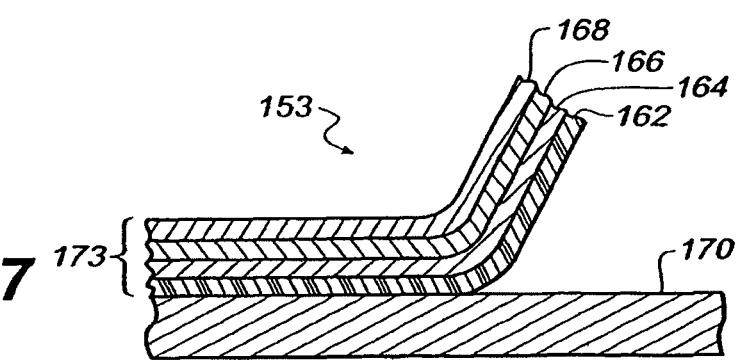
FIG. 7 shows a cross-sectional representation of a guarded cover sheet of the invention comprising a four-layer cover sheet and a partially peeled carrier substrate.

FIG. 7 illustrates another guarded cover sheet composite 153 comprising a cover sheet 173 that is comprised of, for example, four compositionally discrete layers including a lowermost layer 162 nearest to the carrier support 170, two intermediate layers 164 and 166, and an uppermost layer 168. FIG. 7 also shows that the entire multiple layer cover sheet 173 may be peeled from the carrier substrate 170. In this illustration, layer 162 could be a layer promoting adhesion to PVA, layer 164 could be a tie layer, layer 166 could be a low birefringence protective polymer film, and layer 168 could be an auxiliary layer such as an abrasion resistant layer, for example.

Figure 8:
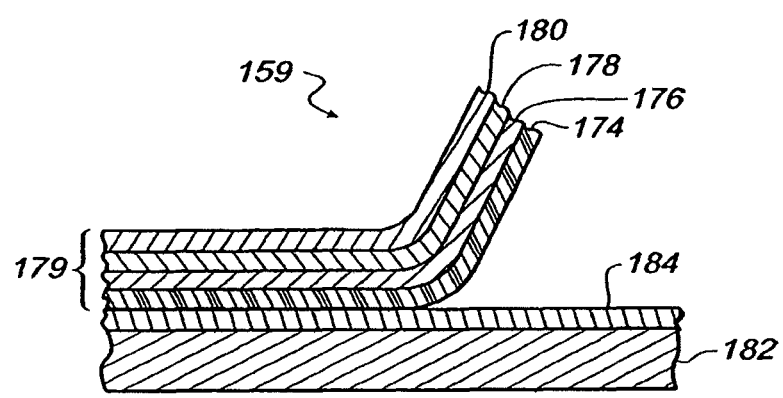
FIG. 8 shows a cross-sectional representation of a guarded cover sheet of the invention comprising a four-layer cover sheet and a partially peeled carrier substrate wherein the carrier substrate has a release layer formed thereon.

FIG. 8 illustrates a further guarded cover sheet composite 159 comprising a cover sheet 179 that is comprised of, for example, four compositionally discrete layers including a lowermost layer 174 nearest to the carrier substrate 182, two intermediate layers 176 and 178, and an uppermost layer 180. The carrier substrate 182 has been treated with a release layer 184 to modify the adhesion between the cover sheet lowermost layer 174 and substrate 182. Release layer 184 may be comprised of a number of polymeric materials such as polyvinylbutyrals, cellulosics, polyacrylates, polycarbonates, and poly(acrylonitrile-co-vinylidene chloride-co-acrylic acid).

The choice of materials used in the release layer may be optimized empirically by those skilled in the art.

FIGS. 5 through 8 serve to illustrate some of the guarded cover sheet composites that may be constructed based on the detailed teachings provided hereinabove, they are not intended to be exhaustive of all possible variations of the invention. One skilled in the art could conceive of many other layer combinations that would be useful as guarded cover sheet composites for use in the preparation of polarizer plates for displays.

Figure 9:
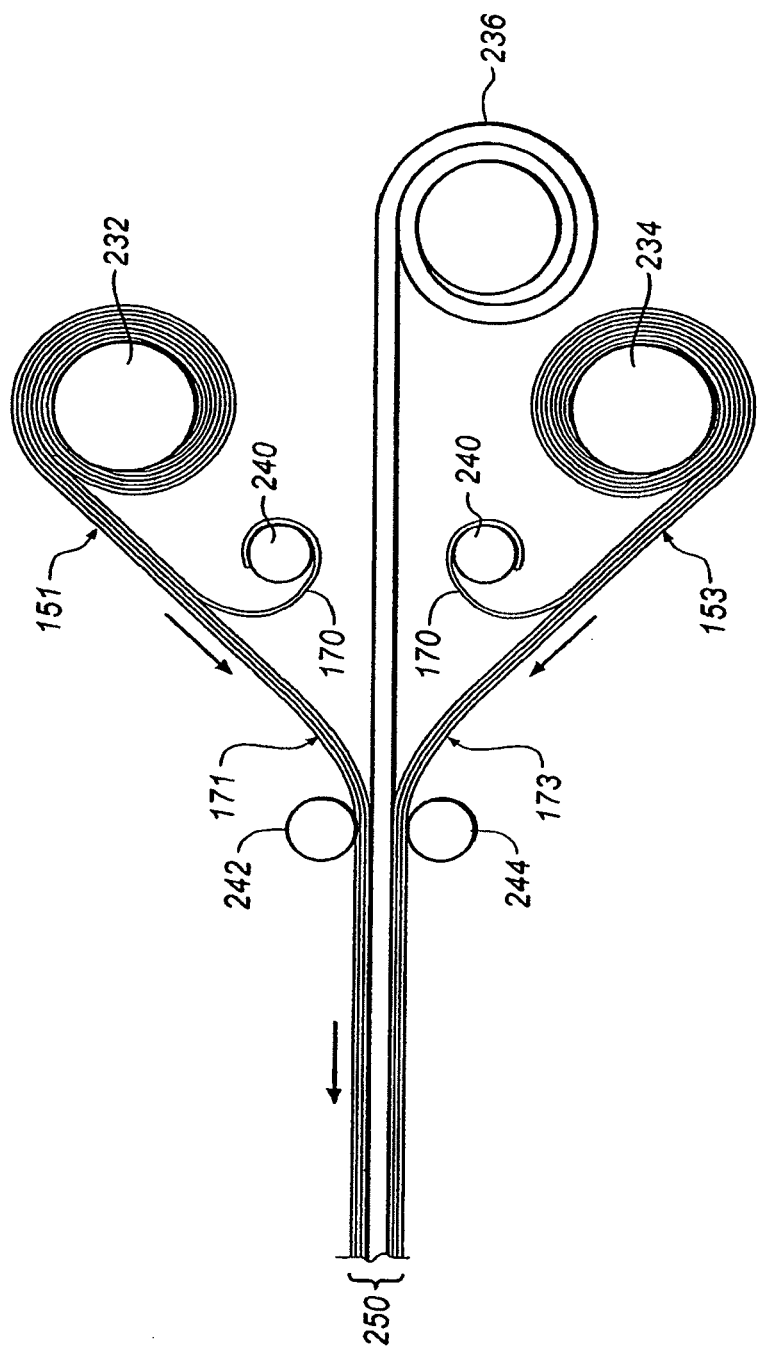
FIG. 9 shows a schematic of a method to fabricate a polarizer plate using the guarded cover sheet composites of the invention.

Turning now to FIG. 9, a schematic representation of a method to fabricate a polarizer plate from guarded cover sheet composites of the invention is illustrated. Guarded cover sheet composite 151 (see FIG. 6) comprising cover sheet 171 and carrier substrate 170 and guarded cover sheet composite 153 (see FIG. 7) comprising cover sheet 173 and carrier substrate 170 are supplied from supply rolls 232 and 234, respectively. A PVA dichroic film is supplied from supply roll 236. Prior to entering a lamination nip between opposing pinch rollers 242 and 244, the carrier substrate 170 is peeled from guarded cover sheet composites 151 and 153 to expose a lowermost layer (in the case of FIGS. 6 and 7, this is layer 162, which for the purpose of example is the layer promoting adhesion to PVA). The peeled carrier sheet 170 is wound into rolls at take-up rolls 240. A glue solution may be optionally applied to both sides of the PVA dichroic film or to the lower-most layer of cover sheets 171 and 173 prior to the sheets and film entering the nip between pinch rollers 242 and 244. Cover sheets 171 and 173 are then laminated to either side of PVA dichroic film with the application of pressure (and, optionally, heat) between the opposing pinch rollers 242 and 244 resulting in the polarizer plate 250 in sheet form. Polarizer plate 250 may then be dried by heating and wound into rolls until needed. Depending on the particular layer configuration for the guarded cover sheet composites employed, a wide variety of polarizer plates having cover sheets with various combinations of auxiliary layers may be fabricated.

For cover sheets of the invention wherein a low birefringence protective polymer film is prepared by a conventional casting process (wherein a polymer dope is case onto a continuous metal wheel or drum and then peeled prior to completion of the drying process) and the tie layer and layer promoting adhesion to PVA are applied in a subsequent coating operation, the method of fabricating polarizing plates is simplified compared to that represented in FIG. 9. In this case, since a carrier substrate is not employed, the step of peeling and winding the carrier substrate as shown in FIG. 9 is not necessary. Instead, the cover sheet, which is preferably supplied in roll form, merely needs to be unwound and supplied to the lamination nip formed between a pair of pinch rollers that are analogous to rollers 242 and 244 shown FIG. 9. As before, a glue solution may be optionally applied to both sides of the PVA dichroic film or to the layers promoting adhesion to PVA prior to the cover sheets and film entering the nip between the pinch rollers.

The cover sheet is laminated to the PVA dichroic film such that the layer promoting adhesion to PVA is on the side of the cover sheet that contacts the PVA dichroic film. The glue solution useful for laminating the cover film and the PVA dichroic film is not particularly limited, a commonly employed example is a water/alcohol solution containing a dissolved polymer such as PVA or its derivatives and a boron compound such as boric acid. Alternatively, the solution may be free or substantially free of dissolved polymer and comprise a reagent that crosslinks PVA. The reagent may crosslink PVA either ionically or covalently or a combination of both types of reagents may be used. Appropriate crosslinking ions include but are not limited to cations such as calcium, magnesium, barium, strontium, boron, beryllium, aluminum, iron, copper, cobalt, lead, silver, zirconium, and zinc ions. Boron compounds such as boric acid and zirconium compounds such as zirconium nitrate or zirconium carbonate are particularly preferred. Examples of covalent crosslinking reagents include polycarboxylic acids or anhydrides; polyamines; epihalohydrins; diepoxides; dialdehydes; diols; carboxylic acid halides, ketenes and like compounds. The amount of the solution applied onto the films can vary widely depending on its composition. For example, a wet film coverage as low as 1 cc/m$^2$ and as high as 100 cc/m$^2$ are possible. Low wet film coverages are desirable to reduce the drying time needed.

Low birefringence protective polymer films suitable for use in the present invention comprise polymeric materials having low Intrinsic Birefringence $\Delta n_{int}$ that form high clarity films with high light transmission (i.e., >85%). Preferably, the low birefringence protective polymer film has in-plane birefringence, $\Delta n_{in}$ of less than about $1 \times 10^{-4}$ and an out-of-plane birefringence, $\Delta n_{th}$ of from 0.005 to −0.005.

Exemplary polymeric materials for use in the low birefringence protective polymer films of the invention include cellulose esters (including triacetyl cellulose (TAC), cellulose diacetate, cellulose acetate butyrate, cellulose acetate propionate), polycarbonates (such as LEXAN available from General Electric Corp., bisphenol-A-trimethylcyclohexane-polycarbonate, bisphenol-A-phthalate-polycarbonate), polysulfones (such as UDEL available from Amoco Performance Products Inc.), polyacrylates, and cyclic olefin polymers (such as ARTON available from JSR Corp., ZEONEX and ZEONOR available from Nippon Zeon, TOPAS supplied by Ticona), among others. Preferably, the low birefringence protective polymer film of the invention comprises TAC, polycarbonate, or cyclic olefin polymers due their commercial availability and excellent optical properties.

The low birefringence protective polymer film has a thickness from about 5 to 200 micrometers, preferably from about 5 to 80 micrometers and most preferably from about 20 to 80 micrometers. Films having thickness of 20 to 80 micrometers are most preferred due to cost, handling, and the ability to fabricate thinner polarizer plates. In a preferred embodiment of the current invention, polarizer plates assembled from cover sheets of the invention have a total thickness of less than 120 micrometers, and most preferably less than 80 micrometers.

The layer promoting adhesion to PVA can comprise one or more water-soluble polymers suitable for the purpose of the present invention including, for example, both synthetic and natural polymers. Naturally occurring polymers include proteins, protein derivatives, cellulose derivatives (e.g. cellulose esters), polysaccharides, casein, and the like, and synthetic polymers include poly(vinyl lactams), acrylamide polymers, polyvinyl alcohol and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl sulfonic acid copolymers, vinyl imidazole copolymers, vinyl sulfide copolymers, homopolymer or copolymers containing styrene sulfonic acid, and the like. The most preferred polymers are polyvinyl alcohol and its derivatives.

Particularly preferred polyvinyl alcohol polymers have a degree of hydrolysis of between 75 and 100% and have a weight average molecular weight of greater than 10,000.

Hydrophobic polymer particles useful in the adhesion-promoting layer include water dispersible polymers and polymer latexes. In order to promote interaction with PVA, the hydrophobic polymer particles preferably contain hydrogen bonding groups, which includes hydroxyl, carboxyl, amino, or sulfonyl moieties. Suitable hydrophobic polymer particles can comprise addition-type polymers and copolymers (including interpolymers) prepared from ethylenically unsaturated monomers such as acrylates including acrylic acid, methacrylates including methacrylic acid, acrylamides and methacrylamides, itaconic acid and its half esters and diesters, styrenes including substituted styrenes, acrylonitrile and methacrylonitrile, vinyl acetates, vinyl ethers, vinyl and vinylidene halides, and olefins. In addition, crosslinking and graft-linking monomers such as 1,4-butyleneglycol methacrylate, trimethylolpropane triacrylate, allyl methacrylate, diallyl phthalate, divinyl benzene, and the like may be used. Other suitable polymer dispersions are polyurethane dispersions or polyesterionomer dispersions, polyurethane/vinyl polymer dispersions, and fluoropolymer dispersions. Preferably, polymers for use in the polymer particles of the invention have a weight average molecular weight of greater than about 10,000 and a glass transition temperature (Tg) of less than about 25° C. In general, high molecular weight, low Tg polymer particles provide improved adhesion of the layer to both PVA dichroic films and the low birefringence polymer film.

Dispersions of hydrophobic polymer particles having a mean particle size in the range of from 10 nanometers to 1 micron, preferably from 10 to 500 nanometers, and most preferably from 10 to 200 nanometers can be employed. Preferably, the polymer particles comprise between 10 and 40 weight % of the layer promoting adhesion to PVA.

The adhesion-promoting layer is highly transparent and, preferably, has a light transmission of greater than 90%, preferably 95%.

The layer promoting adhesion to PVA may also contain a crosslinking agent. Crosslinking agents useful for the practice of the invention include any compounds that are capable of reacting with reactive moieties present on the water soluble polymer and/or polymer particles. Such crosslinking agents include aldehydes and related compounds, pyridiniums, olefins such as bis(vinylsulfonyl methyl)ether, carbodiimides, epoxides, triazines, polyfunctional aziridines, methoxyalkyl melamines, polyisocyanates, and the like. These compounds can be readily prepared using the published synthetic procedure or routine modifications that would be readily apparent to one skilled in the art of synthetic organic chemistry. Additional crosslinking agents that may also be successfully employed in the layer promoting adhesion to PVA include multivalent metal ions such as zinc, calcium, zirconium and titanium.

The layer promoting adhesion to PVA is typically applied at a dried coating weight of 5 to 300 mg/ft$^2$ (50 to 3000 mg/m$^2$), preferably 5 to 100 mg/ft$^2$ (50 to 1000 mg/m$^2$). The layer may be on either side of the cover sheet relative to the low birefringence film. For the guarded cover sheet composites of the invention, preferably, the layer promoting adhesion to PVA is between the carrier substrate and the low birefringence film. Most preferably, the layer promoting adhesion to PVA is applied directly onto the carrier substrate or onto a subbing layer on the carrier substrate. The layer promoting adhesion to PVA may be coated in a separate coating application or it may be applied simultaneously with one or more other layers.

In order to provide good wetting by the water-based glues that may be employed to laminate the cover sheets of the invention to PVA dichroic films it is preferred that the PVA adhesion-promoting layer of the invention has a water contact angle of less than 20°. The adhesion-promoting layer of the invention also preferably has a water swell of between 20 and 1000% to promote good contact and perhaps intermixing of the adhesion-promoting layer with the glue and/or PVA dichroic film.

One embodiment of an adhesion-promoting layer is disclosed in U.S. patent application Ser. No. 10/994,710, filed Nov. 22, 2004.

A tie-layer can be applied to the low birefringence protective polymer film before the adhesion-promoting layer as disclosed in commonly assigned copending U.S. patent application Ser. No. 10/994,711, filed Nov. 22, 2004, hereby incorporated by reference.

Carrier substrates suitable for the use in the present invention include polyethylene terephthalate (PET), polyethylene naphthalate (PEN), polycarbonate, polystyrene, and other polymeric films. Additional substrates may include paper, laminates of paper and polymeric films, glass, cloth, aluminum and other metal supports. Preferably, the carrier substrate is a polyester film comprising polyethylene terephthalate (PET) or polyethylene naphthalate (PEN). The thickness of the carrier substrate is about 20 to 200 micrometers, typically about 40 to 100 micrometers. Thinner carrier substrates are desirable due to both cost and the weight per roll of guarded cover sheet composite. However, carrier substrates less than about 20 micrometers may not provide sufficient dimensional stability or protection for the cover sheet.

The carrier substrate may be coated with one or more subbing layers or may be pretreated with electrical discharge devices to enhance the wetting of the substrate by coating solutions. Since the cover sheet must ultimately be peeled from the carrier substrate the adhesion between cover sheet and substrate is an important consideration. Subbing layers and electrical discharge devices may also be employed to modify the adhesion of the cover sheet to the carrier substrate. Subbing layers may therefore function as either primer layers to improve wetting or release layers to modify the adhesion of the cover sheet to the substrate. The carrier substrate may be coated with two subbing layers, the first layer acting as a primer layer to improve wetting and the second layer acting as a release layer. The thickness of the subbing layer is typically 0.05 to 5 micrometers, preferably 0.1 to 1 micrometers.

Cover sheet/substrate composites having poor adhesion might be prone to blister after application of a second or third wet coating in a multi-pass operation. To avoid blister defects, adhesion should be greater than about 0.3 N/m between the first-pass layer of the cover sheet and the carrier substrate. As already mentioned, the level of adhesion may be modified by a variety of web treatments including various subbing layers and various electronic discharge treatments. However, excessive adhesion between the cover sheet and substrate is also undesirable since the cover sheet may be damaged during subsequent peeling operations. In particular, cover sheet/substrate composites having too great an adhesive force may peel poorly. The maximum adhesive force that allows acceptable peel behavior is dependent on the thickness and tensile properties of the cover sheet. Typically, an adhesive force between the cover sheet and the substrate greater than about 300 N/m may peel poorly. Cover sheets peeled from such excessively well-adhered composites exhibit defects due to tearing of the cover sheet and/or due to cohesive failure within the sheet. In a preferred embodiment of the present invention, the adhesion between the cover sheet and the carrier substrate is less than 250 N/m. Most preferably, the adhesion between the cover sheet and the carrier substrate is between 0.5 and 25 N/m.

In a preferred embodiment of the invention, the carrier substrate is a polyethylene terephthalate film having a first subbing layer (primer layer) comprising a vinylidene chloride copolymer and second subbing layer (release layer) comprising polyvinyl butyral. In another preferred embodiment of the invention the carrier substrate is polyethylene terephthalate film that has been pretreated with a corona discharge prior to application of the cover sheet.

Substrates may also have functional layers such as antistatic layers containing various polymer binders and conductive addenda in order to control static charging and dirt and dust attraction. The antistatic layer may be on either side of the carrier substrate, preferably it is on the side of the carrier substrate opposite to the cover sheet.

On the side of the substrate opposite to the cover sheet a backing layer may also be employed in order to provide a surface having appropriate roughness and coefficient of friction for good winding and conveyance characteristics. In particular, the backing layer comprises a polymeric binder such as a polyurethane or acrylic polymer containing matting agent such a silica or polymeric beads. The matting agent helps to prevent the sticking of the front side of the guarded cover sheet composite to the backside during shipping and storage. The backing layer may also comprise a lubricant to provide a coefficient of friction of about 0.2 to 0.4. Typical lubricants include for example (1) liquid paraffin and paraffin or wax like materials such as carnauba wax, natural and synthetic waxes, petroleum waxes, mineral waxes and the like; (2) higher fatty acids and derivatives, higher alcohols and derivatives, metal salts of higher fatty acids, higher fatty acid esters, higher fatty acid amides, polyhydric alcohol esters of higher fatty acids, etc., disclosed in U.S. Pat. Nos. 2,454,043; 2,732,305; 2,976,148; 3,206,311; 3,933,516; 2,588,765; 3,121,060; 3,502,473; 3,042,222; and 4,427,964, in British Patents 1,263,722; 1,198,387; 1,430,997; 1,466,304; 1,320,757; 1,320,565; and 1,320,756; and in German Patents 1,284,295 and 1,284,294; and (3) perfluoro- or fluoro- or fluorochloro-containing materials, which include poly(tetrafluoroethylene), poly(trifluorochloroethylene), poly(vinylidene fluoride, poly(trifluorochloroethylene-co-vinyl chloride), poly(meth)acrylates or poly(meth)acrylamides containing perfluoroalkyl side groups, and the like. However for lasting lubricity a polymerizable lubricant such as ADDITIVE 31, a methacryloxy-functional silicone polyether copolymer (from Dow Corning Corp.) is preferred.

In a preferred embodiment the guarded cover sheet composite comprises a strippable, protection layer on the surface of the cover sheet opposite to the carrier substrate. The strippable, protection layer may be applied by coating the layer or it may be applied by adhesively adhering or by electrostatically adhering, a preformed protection layer. Preferably, the protection layer is a transparent polymer layer. In one particular embodiment, the protection layer is a low birefringence layer that allows optical inspection of the cover sheet without the need to remove the protection layer. Particularly useful polymers for use in the protection layer include: cellulose esters, acrylics, polyurethanes, polyesters, cyclic olefin polymers, polystyrene, polyvinyl butyral, polycarbonate, and others. When a preformed protection layer is used, it is preferably a layer of polyester, polystyrene, or polyolefin film.

The strippable, protection layer is typically 5 to 100 micrometers in thickness. Preferably, the protection layer is 20 to 50 micrometers thick to insure adequate resistance to scratch and abrasion and provide easy handling during removal of the protection layer.

When the strippable, protection layer is applied by coating methods it may be applied to an already coated and dried cover sheet or the protection layer may be coated simultaneously with one or more layers comprising the cover sheet.

When the strippable, protection layer is a preformed layer it may have a pressure sensitive adhesive layer on one surface that allows the protection layer to be adhesively laminated to the guarded cover sheet composite using conventional lamination techniques. Alternatively, the preformed protection layer may be applied by generating an electrostatic charge on a surface of the cover sheet or the preformed protection layer and then bringing the two materials into contact in a roller nip. The electrostatic charge may be generated by any known electric charge generator, e.g., a corona charger, a tribo-charger, conducting high potential roll charge generator or contact charger, a static charge generator, and the like. The cover sheet or the preformed protection layer may be charged with a DC charge or a DC charge followed by an AC charge in order to create an adequate level of charge adhesion between the two surfaces. The level of electrostatic charge applied to provide a sufficient bond between the cover sheet and the preformed protection layer is at least more than 50 volts, preferably at least more than 200 volts. The charged surface of the cover sheet or the protection layer has a resistivity of at least about $10^{12}$ Ω/square, preferably at least about $10^{16}$ Ω/square in order to insure that the electrostatic charge is long lasting.

Each protective cover sheet may have various auxiliary layers that are necessary to improve the performance of a Liquid Crystal Display. Liquid Crystal Displays typically employ two polarizer plates, one on each side of the liquid crystal cell. Each polarizer plate, in turn, employs two cover sheets, one on each side of the PVA dichroic film. These cover sheets may be different, for example, contain a different subset of possible auxiliary layers.

Useful auxiliary layers employed in the cover sheets of the invention can, for example, include: abrasion resistant hardcoat layer, antiglare layer, anti-smudge layer or stain-resistant layer, antireflection layer, low reflection layer, antistatic layer, viewing angle compensation layer, and moisture barrier layer. Typically, the cover sheet closest to the viewer contains one or more of the following auxiliary layers: the abrasion resistant layer, anti-smudge or stain-resistant layer, antireflection layer, and antiglare layer. One or both of the cover sheets closest to the liquid crystal cell typically contain a viewing angle compensation layer. Any or all of the four cover sheets employed in the LCD may optionally contain an antistatic layer and a moisture barrier layer.

The cover sheets of the invention may contain an abrasion resistant layer on the opposite side of the low birefringence protective polymer film to the layer promoting adhesion to PVA.

Particularly effective abrasion resistant layers for use in the present invention comprise radiation or thermally cured compositions, and preferably the composition is radiation cured. Ultraviolet (UV) radiation and electron beam radiation are the most commonly employed radiation curing methods. UV curable compositions are particularly useful for creating the abrasion resistant layer of this invention and may be cured using two major types of curing chemistries, free radical chemistry and cationic chemistry. Acrylate monomers (reactive diluents) and oligomers (reactive resins and lacquers) are the primary components of the free radical based formulations, giving the cured coating most of its physical characteristics. Photo-initiators are required to absorb the UV light energy, decompose to form free radicals, and attack the acrylate group C=C double bond to initiate polymerization. Cationic chemistry utilizes cycloaliphatic epoxy resins and vinyl ether monomers as the primary components. Photo-initiators absorb the UV light to form a Lewis acid, which attacks the epoxy ring initiating polymerization. By UV curing is meant ultraviolet curing and involves the use of UV radiation of wavelengths between 280 and 420 nm preferably between 320 and 410 nm.

Examples of UV radiation curable resins and lacquers usable for the abrasion resistant layer useful in this invention are those derived from photo polymerizable monomers and oligomers such as acrylate and methacrylate oligomers (the term "(meth)acrylate" used herein refers to acrylate and methacrylate), of polyfunctional compounds, such as polyhydric alcohols and their derivatives having (meth)acrylate functional groups such as ethoxylated trimethylolpropane tri(meth)acrylate, tripropylene glycol di(meth)acrylate, trimethylolpropane tri(meth)acrylate, diethylene glycol di(meth) acrylate, pentaerythritol tetra(meth)acrylate, pentaerythritol tri(meth)acrylate, dipentaerythritol hexa(meth)acrylate, 1,6-hexanediol di(meth)acrylate, or neopentyl glycol di(meth) acrylate and mixtures thereof, and acrylate and methacrylate oligomers derived from low-molecular weight polyester resin, polyether resin, epoxy resin, polyurethane resin, alkyd resin, spiroacetal resin, epoxy acrylates, polybutadiene resin, and polythiol-polyene resin, and the like and mixtures thereof, and ionizing radiation-curable resins containing a relatively large amount of a reactive diluent. Reactive diluents usable herein include monofunctional monomers, such as ethyl (meth)acrylate, ethylhexyl (meth)acrylate, styrene, vinyltoluene, and N-vinylpyrrolidone, and polyfunctional monomers, for example, trimethylolpropane tri(meth)acrylate, hexanediol (meth)acrylate, tripropylene glycol di(meth) acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth) acrylate.

Among others, in the present invention, conveniently used radiation curable lacquers, for use in abrasion resistant layers, include urethane (meth)acrylate oligomers. These are derived from reacting diisocyanates with an oligo(poly)ester or oligo (poly)ether polyol to yield an isocyanate terminated urethane. Subsequently, hydroxy terminated acrylates are reacted with the terminal isocyanate groups. This acrylation provides the unsaturation to the ends of the oligomer. The aliphatic or aromatic nature of the urethane acrylate is determined by the choice of diisocyanates. An aromatic diisocyanate, such as toluene diisocyanate, will yield an aromatic urethane acrylate oligomer. An aliphatic urethane acrylate will result from the selection of an aliphatic diisocyanate, such as isophorone diisocyanate or hexyl methyl diisocyanate. Beyond the choice of isocyanate, polyol backbone plays a pivotal role in determining the performance of the final the oligomer. Polyols are generally classified as esters, ethers, or a combination of these two. The oligomer backbone is terminated by two or more acrylate or methacrylate units, which serve as reactive sites for free radical initiated polymerization. Choices among isocyanates, polyols, and acrylate or methacrylate termination units allow considerable latitude in the development of urethane acrylate oligomers. Urethane acrylates, like most oligomers, are typically high in molecular weight and viscosity. These oligomers are multifunctional and contain multiple reactive sites. Because of the increased number of reactive sites, the cure rate is improved and the final product is cross-linked. The oligomer functionality can vary from 2 to 6.

Among others, conveniently used radiation curable resins, for use in abrasion resistant layers, also include polyfunctional acrylic compounds derived from polyhydric alcohols and their derivatives such as mixtures of acrylate derivatives of pentaerythritol such as pentaeryhritol tetraacrylate and pentaerythritol triacrylate functionalized aliphatic urethanes derived from isophorone diisocyanate. Some examples of urethane acrylate oligomers used in the practice of this invention that are commercially available include oligomers from Sartomer Company (Exton, Pa.). An example of a resin that is conveniently used in the practice of this invention is CN 968 from Sartomer Company.

In one embodiment, an abrasion resistant layer includes a photo polymerization initiator, such as an acetophenone compound, a benzophenone compound, Michler's benzoyl benzoate, α-amyloxime ester, or a thioxanthone compound and a photosensitizer such as n-butyl amine, triethylamine, or tri-n-butyl phosphine, or a mixture thereof is incorporated in the ultraviolet radiation curing composition. In the present invention, conveniently used initiators are 1-hydroxycyclohexyl phenyl ketone and 2-methyl-1-[4-(methyl thio)phenyl]-2-morpholinopropanone-1.

The abrasion resistant layer is typically applied after coating and drying the low birefringence protective polymer film. The abrasion resistant layer of this invention is applied as a coating composition that typically also includes organic solvents. Preferably the concentration of organic solvent is 1-99% by weight of the total coating composition.

Examples of solvents employable for coating the abrasion resistant layer of this invention include solvents such as methanol, ethanol, propanol, butanol, cyclohexane, heptane, toluene and xylene, esters such as methyl acetate, ethyl acetate, propyl acetate and mixtures thereof. With the proper choice of solvent, adhesion of the abrasion resistant layer can be improved while minimizing migration of plasticizers and other addenda from the low birefringence protective polymer film, enabling the hardness of the abrasion resistant layer to be maintained. Suitable solvents for TAC low birefringence protective polymer film are aromatic hydrocarbon and ester solvents such as toluene and propyl acetate.

The UV polymerizable monomers and oligomers are coated and dried, and subsequently exposed to UV radiation to form an optically clear cross-linked abrasion resistant layer. The preferred UV cure dosage is between 50 and 1000 mJ/cm$^2$.

The thickness of the abrasion resistant layer is generally about 0.5 to 50 micrometers preferably 1 to 20 micrometers, more preferably 2 to 10 micrometers.

The abrasion resistant layer is preferably colorless, but it is specifically contemplated that this layer can have some color for the purposes of color correction, or for special effects, so long as it does not detrimentally affect the formation or viewing of the display through the overcoat. Thus, there can be incorporated into the polymer dyes that will impart color. In addition, additives can be incorporated into the polymer that will give to the layer desired properties. Other additional compounds may be added to the coating composition, including surfactants, emulsifiers, coating aids, lubricants, matte particles, rheology modifiers, crosslinking agents, antifoggants, inorganic fillers such as conductive and nonconductive metal oxide particles, pigments, magnetic particles, biocide, and the like.

The abrasion resistant layer of the invention typically provides a layer having a pencil hardness (using the Standard Test Method for Hardness by Pencil Test ASTM D3363) of at least 2H and preferably 2H to 8H.

The cover sheets of the invention may contain an antiglare layer, a low reflection layer or an antireflection layer on the same side of the carrier substrate as the low birefringence protective polymer film. The antiglare layer, low reflection layer or antireflection layer is located on the opposite side of the low birefringence protective polymer film to the layer promoting adhesion to PVA. Such layers are employed in an LCD in order to improve the viewing characteristics of the display, particularly when it is viewed in bright ambient light. The refractive index of an abrasion resistant, hard coat is about 1.50, while the index of the surrounding air is 1.00. This difference in refractive index produces a reflection from the surface of about 4%.

An antiglare coating provides a roughened or textured surface that is used to reduce specular reflection. All of the unwanted reflected light is still present, but it is scattered rather than specularly reflected. For the purpose of the present invention, the antiglare coating preferably comprises a radiation cured composition that has a textured or roughened surface obtained by the addition of organic or inorganic (matting) particles or by embossing the surface. The radiation cured compositions described hereinabove for the abrasion resistant layer are also effectively employed in the antiglare layer. Surface roughness is preferably obtained by the addition of matting particles to the radiation cured composition. Suitable particles include inorganic compounds having an oxide, nitride, sulfide or halide of a metal, metal oxides being particularly preferred. As the metal atom, Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb and Ni are suitable, and Mg, Ca, B and Si are more preferable. An inorganic compound containing two types of metal may also be used. A particularly preferable inorganic compound is silicon dioxide, namely silica.

Additional particles suitable for use in the antiglare layer of the present invention include the layered clays described in commonly-assigned U.S. patent application Ser. No. 10/690,123, filed Oct. 21, 2003. The most suitable layered particles include materials in the shape of plates with high aspect ratio, which is the ratio of a long direction to a short direction in an asymmetric particle. Preferred layered particles are natural clays, especially natural smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred clay materials include natural montmorillonite, hectorite and hydrotalcites, because of commercial availability of these materials.

The layered materials suitable for the antiglare layer may comprise phyllosilicates, for example, montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials may include illite, mixed layered illite/smectite minerals, such as ledikite and admixtures of illites with the layered materials named above. Other useful layered materials, particularly useful with anionic matrix polymers, may include the layered double hydroxide clays or hydrotalcites, such as $Mg_6Al_{3.4}(OH)_{18.8}(CO_3)_{1.7}H_2O$, which have positively charged layers and exchangeable anions in the interlayer spaces. Preferred layered materials are swellable so that other agents, usually organic ions or molecules, may splay, that is, intercalate and/or exfoliate, the layered material resulting in a desirable dispersion of the inorganic phase. These swellable layered materials include phyllosilicates of the 2:1 type, as defined in the literature (for example, "An introduction to clay colloid chemistry," by H. van Olphen, John Wiley & Sons Publishers). Typical phyllosilicates with ion exchange capacity of 50 to 300 milliequivalents per 100 grams are preferred. Generally, it is desirable to treat the selected clay material to separate the agglomerates of platelet particles to small crystals, also called tactoids, prior to introducing the platelet particles to the antiglare coating. Predispersing or separating the platelet particles also improves the binder/platelet interface. Any treatment that achieves the above goals may be used. Examples of useful treatments include intercalation with water-soluble or water insoluble polymers, organic reagents or monomers, silane compounds, metals or organometallics, organic cations to effect cation exchange, and their combinations.

Additional particles for use in the antiglare layer include polymer matte particles or beads which are well known in the art. The polymer particles may be solid or porous, preferably crosslinked polymer particles. Porous polymer particles for use in an antiglare layer are described in commonly-assigned U.S. patent application Ser. No. 10/715,706, filed Nov. 18, 2003.

In a preferred embodiment, particles for use in the antiglare layer have an average particle size ranging from 2 to 20 micrometers, preferably from 2 to 15 micrometers and most preferably from 4 to 10 micrometers. They are present in the layer in an amount of at least 2 wt percent and less than 50 percent, typically from about 2 to 40 wt. percent, preferably from 2 to 20 percent and most preferably from 2 to 10 percent.

The thickness of the antiglare layer is generally about 0.5 to 50 micrometers preferably 1 to 20 micrometers more preferably 2 to 10 micrometers.

Preferably, the antiglare layer has a 60° Gloss value, according to ASTM D523, of less than 100, preferably less than 90 and a transmission haze value, according to ASTM D-1003 and JIS K-7105 methods, of less than 50%, preferably less than 30%.

In another embodiment of the present invention, a low reflection layer or antireflection layer is used in combination with an abrasion resistant hard coat layer or antiglare layer. The low reflection or antireflection coating is applied on top of the abrasion resistant or antiglare layer. Typically, a low reflection layer provides an average specular reflectance (as measured by a spectrophotometer and averaged over the wavelength range of 450 to 650 nm) of less than 2%. Antireflection layers provide average specular reflectance values of less than 1%.

Suitable low reflection layers for use in the present invention comprise fluorine-containing homopolymers or copolymers having a refractive index of less than 1.48, preferably with a refractive index between about 1.35 and 1.40. Suitable fluorine-containing homopolymers and copolymers include: fluoro-olefins (for example, fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid, and completely or partially fluorinated vinyl ethers, and the like. The effectiveness of the layer may be improved by the incorporation of submicron-sized inorganic particles or polymer particles that induce interstitial air voids within the coating. This technique is further described in U.S. Pat. No. 6,210,858 and U.S. Pat. No. 5,919,555. Further improvement of the effectiveness of the low reflection layer may be realized with the restriction of air voids to the internal particle space of submicron-sized polymer particles with reduced coating haze penalty, as described in commonly-assigned U.S. patent application Ser. No. 10/715,655, filed Nov. 18, 2003.

The thickness of the low reflection layer is 0.01 to 1 micrometer and preferably 0.05 to 0.2 micrometer.

An antireflection layer may comprise a monolayer or a multi-layer. Antireflection layers comprising a monolayer typically provide reflectance values less than 1% at only a single wavelength (within the broader range of 450 to 650 nm). A commonly employed monolayer antireflection coating that is suitable for use in the present invention comprises a layer of a metal fluoride such as magnesium fluoride ($MgF_2$). The layer may be applied by well-known vacuum deposition technique or by a sol-gel technique. Typically, such a layer has an optical thickness (i.e., the product of refractive index of the layer times layer thickness) of approximately one quarter-wavelength at the wavelength where a reflectance minimum is desired.

Although a monolayer can effectively reduce the reflection of light within a very narrow wavelength range, more often a multi-layer comprising several (typically, metal oxide based) transparent layers superimposed on one another is used to reduce reflection over a wide wavelength region (i.e., broadband reflection control). For such a structure, half wavelength layers are alternated with quarter wavelength layers to improve performance. The multi-layer antireflection coating may comprise two, three, four, or even more layers. Formation of this multi-layer typically requires a complicated process comprising a number of vapor deposition procedures or sol-gel coatings, which correspond to the number of layers, each layer having a predetermined refractive index and thickness. Precise control of the thickness of each layer is required for these interference layers. The design of suitable multi-layer antireflection coatings for use in the present invention is well known in the patent art and technical literature, as well as being described in various textbooks, for example, in H. A. Macleod, "Thin Film Optical Filters," Adam Hilger, Ltd., Bristol 1985 and James D. Rancourt, "Optical Thin Films User's Handbook," Macmillan Publishing Company, 1987.

The cover sheets of the invention may also contain a moisture barrier layer. The moisture barrier layer comprises a hydrophobic polymer such as a vinylidene chloride polymer, vinylidene fluoride polymer, polyurethane, polyolefin, fluorinated polyolefin, polycarbonate, and others, having a low moisture permeability. Preferably, the hydrophobic polymer comprises vinylidene chloride. More preferably, the hydrophobic polymer comprises 70 to 99 weight percent of vinylidene chloride. The moisture barrier layer may be applied by application of an organic solvent-based or aqueous coating formulation. To provide effective moisture barrier properties the layer should be at least 1 micrometer in thickness, preferably from 1 to 10 micrometers in thickness, and most preferably from 2 to 8 micrometers in thickness. The cover sheet of the invention comprising a moisture barrier layer has a moisture vapor transmission rate (MVTR) according to ASTM F-1249 that is less than 1000 g/m$^2$/day, preferably less than 800 g/m$^2$/day and most preferably less than 500 g/m$^2$/day. The use of such a barrier layer in the cover sheet of the invention provides improved resistance to changes in humidity and increased durability of the polarizer plate comprising the cover sheet, especially for TAC cover sheets having a thickness less than about 40 micrometers.

The cover sheets of the invention may contain a transparent antistatic layer. The antistatic layer aids in the control of static charging that may occur during the manufacture and use of the cover sheet composite. Effective control of static charging reduces the propensity for the attraction of dirt and dust to the cover sheet composite. The guarded cover sheet composite of the invention may be particularly prone to triboelectric charging during the peeling of the cover sheet from the carrier substrate. The so-called "separation charge" that results from the separation of the cover sheet and the substrate can be effectively controlled by an antistatic layer having a resistivity of less than about $1\times10^{11}$ Ω/square, preferably less than $1\times10^{10}$ Ω/square, and most preferably less than $1\times10^9$ Ω/square.

Various polymeric binders and conductive materials may be employed in the antistatic layer. Polymeric binders useful in the antistatic layer include any of the polymers commonly used in the coating art, for example, interpolymers of ethylenically unsaturated monomers, cellulose derivatives, polyurethanes, polyesters, hydrophilic colloids such as gelatin, poly(vinyl alcohol), polyvinyl pyrrolidone, and others.

Conductive materials employed in the antistatic layer may be either ionically-conductive or electronically-conductive. Ionically-conductive materials include simple inorganic salts, alkali metal salts of surfactants, polymeric electrolytes containing alkali metal salts, and colloidal metal oxide sols (stabilized by metal salts). Of these, ionically-conductive polymers such as anionic alkali metal salts of styrene sulfonic acid copolymers and cationic quaternary ammonium polymers of U.S. Pat. No. 4,070,189 and ionically-conductive colloidal metal oxide sols which include silica, tin oxide, titania, antimony oxide, zirconium oxide, alumina-coated silica, alumina, boehmite, and smectite clays are preferred.

The antistatic layer employed in the current invention preferably contains an electronically-conductive material due to their humidity and temperature independent conductivity. Suitable materials include:

(1) electronically-conductive metal-containing particles including donor-doped metal oxides, metal oxides containing oxygen deficiencies, and conductive nitrides, carbides, and bromides. Specific examples of particularly useful particles include conductive $SnO_2$, $In_2O$, $ZnSb_2O_6$, $InSbO_4$, $TiB_2$, $ZrB_2$, $NbB_2$, $TaB_2$, $CrB$, $MoB$, $WB$, $LaB_6$, $ZrN$, $TiN$, $WC$, $HfC$, $HfN$, and $ZrC$. Examples of the patents describing these electrically conductive particles include; U.S. Pat. Nos. 4,275,103; 4,394,441; 4,416,963; 4,418,141; 4,431,764; 4,495,276; 4,571,361; 4,999,276; 5,122,445; and 5,368,995;

(2) fibrous electronic conductive particles comprising, for example, antimony-doped tin oxide coated onto non-conductive potassium titanate whiskers as described in U.S. Pat. Nos. 4,845,369 and 5,166,666, antimony-doped tin oxide fibers or whiskers as described in U.S. Pat. Nos. 5,719,016 and 5,0731, 119, and the silver-doped vanadium pentoxide fibers described in U.S. Pat. No. 4,203,769; and (3) electronically-conductive polyacetylenes, polythiophenes, and polypyrroles, preferably the polyethylene dioxythiophene described in U.S. Pat. No. 5,370,981 and commercially available from Bayer Corp. as BAYTRON POLYETHYLENE DIOXYTHIOPHENE.

The amount of the conductive agent used in the antistatic layer can vary widely depending on the conductive agent employed. For example, useful amounts range from about 0.5 mg/m$^2$ to about 1000 mg/m$^2$, preferably from about 1 mg/m$^2$ to about 500 mg/m$^2$. The antistatic layer has a thickness of from 0.05 to 5 micrometers, preferably from 0.1 to 0.5 micrometers to insure high transparency.

The cover sheets of the invention may contain a viewing angle compensation layer (also referred to as a compensation layer, retarder layer, or phase difference layer), with proper optical properties, between the PVA dichroic film and liquid crystal cell, such as disclosed in U.S. Pat. Nos. 5,583,679; 5,853,801; 5,619,352; 5,978,055; and 6,160,597. A compensation film according to U.S. Pat. Nos. 5,583,679 and 5,853, 801 based on discotic liquid crystals which have negative birefringence, is widely used.

Compensation films are used to improve the viewing angle characteristic, which describes a change in contrast ratio from different viewing angles. It is desirable to be able to see the same image from a wide variation in viewing angles and this ability has been a shortcoming with liquid crystal display devices. The primary factor limiting the contrast of a liquid crystal display is the propensity for light to "leak" through liquid crystal elements or cells, which are in the dark or "black" pixel state. Furthermore, the leakage and hence contrast of a liquid crystal display are also dependent on the direction from which the display screen is viewed. Typically the optimum contrast is observed only within a narrow viewing angle range centered about the normal incidence to the display and falls off rapidly as the viewing direction deviates from the display normal. In color displays, the leakage problem not only degrades the contrast but also causes color or hue shifts with an associated degradation of color reproduction.

Viewing angle compensation layers useful in the present invention are optically anisotropic layers. The optically anisotropic, viewing angle compensation layers may comprise positively birefringent materials or negatively birefringent materials. The compensation layer may be optically uniaxial or optically biaxial. The compensation layer may have its optic axis tilted in the plane perpendicular to the layer. The tilt of the optic axis may be constant in the layer thickness direction or the tilt of the optic axis may vary in the layer thickness direction.

Optically anisotropic, viewing angle compensation layers useful in the present invention may comprise the negatively birefringent, discotic liquid crystals described in U.S. Pat. Nos. 5,583,679, and 5,853,801; the positively birefringent nematic liquid crystals described in U.S. Pat. No. 6,160,597; the negatively birefringent amorphous polymers described in commonly assigned U.S. Patent Application Publication 2004/0021814A and U.S. patent application Ser. No. 10/745, 109, filed Dec. 23, 2003. These latter two patent applications describe compensation layers comprising polymers that contain non-visible chromophore groups such as vinyl, carbonyl, amide, imide, ester, carbonate, sulfone, azo, and aromatic groups (i.e. benzene, naphthalate, biphenyl, bisphenol A) in the polymer backbone and that preferably have a glass transition temperature of greater than 180 degree C. Such polymers are particularly useful in the compensation layer of the present invention. Such polymers include polyesters, polycarbonates, polyimides, polyetherimides, and polythiophenes. Of these, particularly preferred polymers for use in the present invention include: (1) a poly(4,4'-hexafluoroisopropylidene-bisphenol) terephthalate-co-isophthalate; (2) a poly(4,4'-hexahydro-4,7-methanoindan-5-ylidene bisphenol) terephthalate; (3) a poly(4,4'-isopropylidene-2, 2'6,6'-tetrachlorobisphenol) terephthalate-co-isophthalate; (4) a poly(4,4'-hexafluoroisopropylidene)-bisphenol-co-(2-norbornylidene)-bisphenol terephthalate; (5) a poly(4,4'-hexahydro-4,7-methanoindan-5-ylidene)-bisphenol-co-(4, 4'-isopropylidene-2,2',6,6'-tetrabromo)-bisphenol terephthalate; (6) a poly(4,4'-isopropylidene-bisphenol-co-4, 4'-(2-norbornylidene)bisphenol)terephthalate-co-isophthalate; (7) a poly(4,4'-hexafluoroisopropylidene-bisphenol-co-4,4'-(2-norbornylidene)bisphenol)terephthalate-co-isophthalate; or (8) copolymers of any two or more of the foregoing. A compensation layer comprising these polymers typically has an out-of-plane retardation, $R_{th}$, that is more negative than −20 nm, preferably $R_{th}$ is from 60 to −600 nm, and most preferably $R_{th}$ is from −150 to −500 nm.

Another compensation layer suitable for the present invention includes an optically anisotropic layer comprising an exfoliated inorganic clay material in a polymeric binder as described in Japanese Patent Application 11095208A.

The auxiliary layers of the invention can be applied by any of a number of well known liquid coating techniques, such as dip coating, rod coating, blade coating, air knife coating, gravure coating, microgravure coating, reverse roll coating, slot coating, extrusion coating, slide coating, curtain coating, or by vacuum deposition techniques. In the case of liquid coating, the wet layer is generally dried by simple evaporation, which may be accelerated by known techniques such as convection heating. The auxiliary layer may be applied simultaneously with other layers such as subbing layers and the low birefringence protective polymer film. Several different auxiliary layers may be coated simultaneously using slide coating, for example, an antistatic layer may be coated simultaneously with a moisture barrier layer or a moisture barrier layer may be coated simultaneously with a viewing angle compensation layer. Known coating and drying methods are described in further detail in Research Disclosure 308119, Published December 1989, pages 1007 to 1008.

The cover sheets of the invention are suitable for use with a wide variety of LCD display modes, for example, Twisted Nematic (TN), Super Twisted Nematic (STN), Optically Compensated Bend (OCB), In Plane Switching (IPS), or Vertically Aligned (VA) liquid crystal displays. These various liquid crystal display technologies have been reviewed in U.S. Pat. Nos. 5,619,352 (Koch et al.), 5,410,422 (Bos), and 4,701,028 (Clerc et al.).

Figure 10:
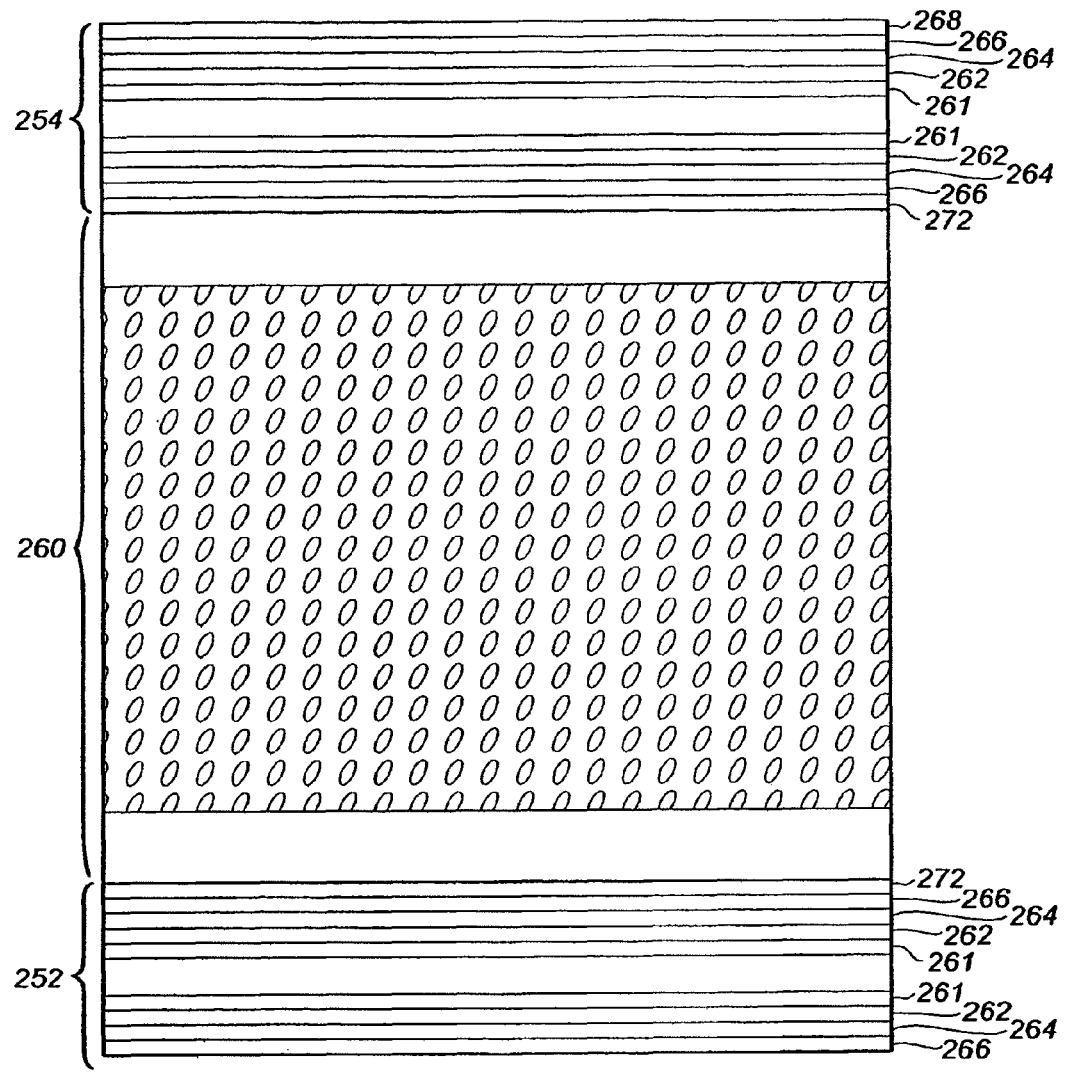
FIG. 10 shows a cross-sectional representation of a liquid crystal cell with polarizer plates on either side of the cell in accordance with the present invention.

FIG. 10 presents a cross-sectional illustration showing one embodiment of a typical liquid crystal cell 260 having polarizer plates 252 and 254 disposed on either side. Polarizer plate 254 is on the side of the LCD cell closest to the viewer. Each polarizer plate employs two cover sheets. For the purpose of illustration, polarizer plate 254 is shown with an uppermost cover sheet (this is the cover sheet closest to the viewer) comprising a layer promoting adhesion to PVA 261, tie layer 262, low birefringence protective polymer film 264, barrier layer 266, and antiglare layer 268. The lowermost cover sheet contained in polarizer plate 254 comprises a layer promoting adhesion to PVA 261, tie layer 262, low birefringence protective polymer film 264, barrier layer 266, and viewing angle compensation layer 272. On the opposite side of the LCD cell, polarizer plate 252 is shown with an uppermost cover sheet, which for the purpose of illustration, comprises a layer promoting adhesion to PVA 261, tie layer 262, low birefringence protective polymer film 264, barrier layer 266, and viewing angle compensation layer 272. Polarizer plate 252 also has a lowermost cover sheet comprising a layer promoting adhesion to PVA 261, tie layer 262, low birefringence protective polymer film 264, and barrier layer 266.

Another aspect of the present invention is directed to a method of forming a polarizing plate comprising:

(A) providing two guarded cover sheet composites each comprising:
(i) a carrier substrate; and
(ii) a protective cover sheet as in claim 1

(B) providing a poly(vinyl alcohol)-containing dichroic film; and (C) simultaneously or sequentially bringing each protective cover sheet into contact with said poly(vinyl alcohol)-containing dichroic film such that the layer promoting adhesion to a poly(vinyl alcohol)-containing film in each protective cover sheet is in contact with said poly(vinyl alcohol)-containing dichroic film.

The invention is also directed to a method not involving a carrier sheet in which the method comprises forming a polarizing plate comprising providing two cover sheets as described above, providing a poly(vinyl alcohol)-containing dichroic film, and simultaneously or sequentially bringing said cover sheets into contact with said poly(vinyl alcohol)-containing dichroic film such that the layer promoting adhesion to a poly(vinyl alcohol)-containing film in each of said two cover sheets is in contact with said poly(vinyl alcohol)-containing dichroic film. The present invention is illustrated in more detail by the following non-limiting examples.

EXAMPLES

Synthesis of UV-Absorbing Polymers

UV Absorbing Polymer Latex 1:

A stirred reactor containing 125 g of water and 4.3 g of Rhodaplex® CO-436 surfactant (58% solids) was heated to 85° C. and purged with $N_2$ for 0.5 hour. Then, 1.25 g of potassium persulfate and 0.25 g of sodium metabisulfate were added to the reactor. An emulsion containing 600 g of deionized water, 188 g of NORBLOC 7966 (Ciba) UV monomer, 50 g of ethyl acrylate, 12.5 g of methacrylic acid, 4.3 g of RHODAPLEX CO-436 (58% solids) surfactant, 1.25 g of potassium persulfate and 0.25 g of sodium was added continuously for 1 hour. The reaction was allowed to continue for 4 more hours before the reactor was cooled down to room temperature. A UV absorbing polymer latex was filtered through glass fiber to remove any coagulum. The resultant UV absorbing polymer latex had a solid of about 25% and the particle had a mean size of about 80 nm and a composition of 75% by weight of Norbloc® 7966, 20% by weight of ethyl acrylate, and 5% by weight of methacrylic acid.

UV Absorbing Polymer Latex 2:

A stirred reactor containing 125 g of water and 4.3 g of Rhodaplex® CO-436 surfactant (58% solids) was heated to 85° C. and purged with $N_2$ for 0.5 hour. Then, 1.25 g of potassium persulfate and 0.25 g of sodium metabisulfate were added to the reactor. An emulsion containing 600 g of deionized water, 188 g of NOBLOC 7966 (Ciba), 50 g of ethyl acrylate, 12.5 g of methacrylamide, 4.3 g of RHODAPLEX CO-436 (58% solids), 1.25 g of potassium persulfate and 0.25 g of sodium was added continuously for 1 hour. The reaction was allowed to continue for 4 more hours before the reactor was cooled down to room temperature. The UV absorbing polymer latex was filtered through glass fiber to remove any coagulum. The resultant UV-absorbing polymer latex had a solid of about 25% and the particle had a mean size of about 80 nm and a composition of 75% by weigh of NORBLOC 7966, 20% by weight of ethyl acrylate, and 5% by weight of methacrylamide.

Example 1

Invention

A 100 micrometer thick poly(ethylene terephthalate) (PET) carrier substrate having an antistatic backing layer (backside) is coated on its front surface with an adhesion-promoting layer comprising CERVOL 205 PVA (polyvinyl alcohol having a degree of hydrolysis of about 88-89%, available from Celanese Corp.) having a dry coating weight of about 100 mg/ft$^2$ (1000 mg/m$^2$), and UV absorbing latex polymer 1, as described above, having a dry coating weight of about 83 mg/ft$^2$ (830 mg/m$^2$). The dried layer is then over-coated with a triacetyl cellulose (TAC) formulation comprising three layers: a surface layer comprising CA-438-80S (triacetyl cellulose from Eastman Chemical) having a dry coating weight of about 208 mg/ft$^2$ (2080 mg/m$^2$), diethyl phthalate having a dry coating weight of about 20.8 mg/ft$^2$ (208 mg/m$^2$), and SURFLON S-8405-S50 (a fluorinated surfactant from Semi Chemical Co. Ltd) having a dry coating weight of about 21 mg/ft$^2$ (210 mg/m$^2$); a mid layer comprising CA-438-80S having a dry coating weight of about 1899 mg/ft$^2$ (18990 mg/m$^2$), SURFLON S-8405-S50 having a dry coating weight of about 29.5 mg/ft$^2$ (295 mg/m$^2$), diethyl phthalate having a dry coating weight of about 284 mg/ft$^2$ (2840 mg/m$^2$) and TINUVIN 326 having a dry coating weight of about 83 mg/ft$^2$ (830 mg/m$^2$); a lower layer as the tie layer comprising a mixture of 95:5 cellulose acetate trimellitate (Sigma-Aldrich) and trimethyl borate and having a dry coating weight of about 100 mg/ft$^2$ (1000 mg/m$^2$). The TAC formulation was applied with a multi-slot slide hopper using a mixture of methylene chloride and methanol as the coating solvent.

The dried TAC coating was peeled off from the PET carrier substrate at the interface between the front side of the carrier substrate and the layer promoting adhesion to PVA film. The peeling was very smooth and the peeled TAC film had very low haze and a good appearance that was free from wrinkles.

Example 2

Invention

The Example was prepared in a similar manner as the Invention Example 1 except that the adhesion-promoting layer comprised CERVOL 205 PVA (polyvinyl alcohol having a degree of hydrolysis of about 88-89%, available from Celanese Corp.) having a dry coating weight of about 100 mg/ft$^2$ (1000 mg/m$^2$), and UV absorbing latex polymer 2, as described above, having a dry coating weight of about 83 mg/ft$^2$ (830 mg/m$^2$).

The dried TAC coating was peeled off from the PET carrier substrate at the interface between the front side of the carrier substrate and the layer promoting adhesion to PVA film. The peeling was very smooth and the peeled TAC film had very low haze and a good appearance that was free from wrinkles.

Example 3

Comparison

The Comparative Example 2 was prepared in a similar manner as the Invention Example 1 except that the adhesion-promoting layer comprised only CERVOL 205 PVA at a dry coating weight of about 100 mg/ft$^2$ (1000 mg/m$^2$), and the mid layer comprising CA-438-80S having a dry coating weight of about 1899 mg/ft$^2$ (18990 mg/m$^2$), SURFLON S-8405-S50 having a dry coating weight of about 29.5 mg/ft$^2$ (295 mg/m$^2$), diethyl phthalate having a dry coating weight of about 284 mg/ft$^2$ (2840 mg/m$^2$), TINUVIN 8515 UV absorber having a dry coating weight of about 65 mg/ft$^2$ (650 mg/m$^2$), and PARSOL 1789 UV absorber having a dry coating weight of about 6.5 mg/ft$^2$ (65 mg/m$^2$)

The dried TAC coating was peeled off from the PET carrier substrate at the interface between the front side of the carrier substrate and the layer promoting adhesion to PVA film. The peeling was very smooth and the peeled TAC film had a good appearance that was free from wrinkles but an unacceptable level of haze.

The above examples clearly demonstrate that the present invention has overcome the limitations of prior art polarizer cover sheets and eliminated the need for complex surface treatments such as saponification prior to the fabrication of polarizer plates.

The invention has been described in detail with particular reference to certain preferred embodiments thereof, but it will be understood that variations and modifications can be effected within the spirit and scope of the invention.

PARTS LIST 10 coating and drying system
12 moving carrier substrate/web
14 dryer
16 coating apparatus
18 unwinding station
20 back-up roller
22 coated substrate
24 guarded cover sheet composite
26 wind-up station
28 coating supply vessel
30 coating supply vessel
32 coating supply vessel
34 coating supply vessel
36 pump
38 pump
40 pump
42 pump
44 conduit
46 conduit
48 conduit
50 conduit
52 discharge device
54 polar charge assist device
56 nip roller
58 nip roller
60 preformed strippable protection layer
62 unwinding station
64 wind up station
66 drying section
68 drying section
70 drying section
72 drying section
74 drying section
76 drying section
78 drying section
80 drying section
82 drying section
92 front section
94 second section
96 third section
98 fourth section
100 back plate
102 inlet
104 $1^{st}$ metering slot
106 pump
108 lowermost layer
110 inlet
112 $2^{nd}$ metering slot
114 pump
116 layer
118 inlet
120 metering slot
122 pump
124 layer
126 inlet
128 metering slot
130 pump
132 layer
134 inclined slide surface
136 coating lip
138 $2^{nd}$ inclined slide surface
140 $3^{rd}$ inclined slide surface
142 $4^{th}$ inclined slide surface
144 back land surface
146 coating bead
151 guarded cover sheet composite
153 guarded cover sheet composite
159 guarded cover sheet composite
162 lowermost layer
164 intermediate layer
166 intermediate layer
168 uppermost layer
170 carrier substrate
171 coversheet
173 cover sheet
174 lowermost layer
176 intermediate layer
178 intermediate layer
179 cover sheet
180 uppermost layer
182 carrier substrate
184 release layer
186 lowermost layer
187 intermediate layer
188 intermediate layer
189 cover sheet
190 uppermost layer
200 feed line
202 extrusion hopper
204 pressurized tank
206 pump
208 metal drum
210 first drying section
212 drying oven
214 cast film
216 final drying section
218 final dried film
220 wind-up station
232 guarded cover sheet composite supply roll
234 guarded cover sheet composite supply roll
236 PVA dichroic film supply roll
240 carrier substrate take-up roll
242 pinch roller
244 pinch roller
250 polarizer plate
252 polarizer plate
254 polarizer plate
260 LCD cell
261 layer promoting adhesion to PVA
262 tie layer
264 low birefringence protective polymer film
266 barrier layer
268 antiglare layer
272 viewing angle compensation layer

What is claimed is:

1. A method of forming a polarizing plate comprising:
   (A) providing at least one guarded cover sheet composites comprising:
      (i) a carrier substrate; and
      (ii) a protective cover sheet comprising a low birefringence protective polymer film having in-plane birefringence, $\Delta n_{in}$ of less than $1 \times 10^{-4}$ and an out-of-plane birefringence $\Delta n_{th}$ of 0.005 to −0.005 and, in addition, one or more functional layers, which layers are either adjacent or non-adjacent each other, wherein the one or more functional layers comprise at least an adhesion-promoting layer for adhering a poly(vinyl alcohol)-containing film to the low birefringence protective polymer film, wherein the functional layers do not comprise a polarizing film, wherein the adhesion-promoting layer which is a functional layer comprises a UV-absorbing polymer, and wherein the adhesion-promoting layer is coated onto the carrier substrate and then dried, prior to application of the low birefringence protective polymer film;

(B) providing a poly(vinyl alcohol)-containing dichroic film;

(C) removing the carrier substrate from the guarded cover sheet composite after formation of the protective cover sheet; and (D) bringing the protective cover sheet into contact with the poly(vinyl alcohol)-containing dichroic film such that the adhesion-promoting layer in the protective cover sheet is in contact with the poly(vinyl alcohol)-containing dichroic film.

2. The method according to claim 1, wherein said carrier substrate is a polymeric film.

3. A method of forming a polarizing plate comprising:
providing two guarded cover sheet composites each comprising a protective cover sheet comprising a low birefringence protective polymer film having in-plane birefringence, $\Delta n_{in}$ of less than $1\times10^{-4}$ and an out-of-plane birefringence $\Delta n_{th}$ of 0.005 to −0.005 and, in addition, one or more functional layers, which layers are either adjacent or non-adjacent each other, wherein the one or more functional layers comprise at least an adhesion-promoting layer for adhering a poly(vinyl alcohol)-containing film to the low birefringence protective polymer film, wherein the functional layers do not comprise a polarizing film, wherein the adhesion-promoting layer which is a functional layer comprises a UV-absorbing polymer, and wherein the adhesion-promoting layer is coated onto a carrier substrate and then dried, prior to application of the low birefringence protective polymer film;

providing a poly(vinyl alcohol)-containing dichroic film, and simultaneously or sequentially bringing said cover sheets into contact with said poly(vinyl alcohol)-containing dichroic film such that the adhesion-promoting layer for adhering a poly(vinyl alcohol)-containing film to the low birefringence protective polymer in each of the two cover sheets is in contact with the poly(vinyl alcohol)-containing dichroic film, and removing carrier substrates from the guarded cover sheet composites after formation of the protective cover sheets.

4. The method according to claim 3, wherein said carrier substrates are polymeric films.

* * * * *